US011982962B2

(12) United States Patent
Hotomi et al.

(10) Patent No.: US 11,982,962 B2
(45) Date of Patent: May 14, 2024

(54) IMAGE FORMING APPARATUS

(71) Applicant: CANON KABUSHIKI KAISHA, Tokyo (JP)

(72) Inventors: Daigo Hotomi, Ibaraki (JP); Masato Kobayashi, Chiba (JP); Katsuya Nose, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/168,685

(22) Filed: Feb. 14, 2023

(65) Prior Publication Data

US 2023/0273560 A1 Aug. 31, 2023

(30) Foreign Application Priority Data

Feb. 28, 2022 (JP) ................................ 2022-030500

(51) Int. Cl.
*G03G 15/00* (2006.01)
*G03G 21/00* (2006.01)

(52) U.S. Cl.
CPC ......... *G03G 15/50* (2013.01); *G03G 21/0011* (2013.01)

(58) Field of Classification Search
CPC .......................... G03G 15/50; G03G 21/0011
USPC ........................................ 399/75, 76, 82, 85
See application file for complete search history.

(56) References Cited

FOREIGN PATENT DOCUMENTS

| | | | |
|---|---|---|---|
| JP | 2011191732 | * | 9/2011 |
| JP | 2013-068920 A | | 4/2013 |

* cited by examiner

*Primary Examiner* — Hoan H Tran
(74) *Attorney, Agent, or Firm* — Venable LLP

(57) ABSTRACT

An image forming apparatus includes a rotatable image bearing member, a transfer member, a cleaning blade, a driving portion, and a controller. The controller is capable of executing, at a time of an end of a job, a plurality of operations including a first reverse rotating operation, a first normal rotating operation executed subsequently to the first reverse rotating operation, a second reverse rotating operation executed after the first normal rotating operation, and a second normal rotating operation executed subsequently to the second reverse rotating operation. The controller controls the driving portion so that a movement amount of the image bearing member in the second normal rotating operation is smaller than a movement amount of the image bearing member in the second reverse rotating operation.

9 Claims, 11 Drawing Sheets

(1) BLADE-2RY TRNSFR DISTANCE : 396.5mm (2) 2RY TRNSFR-DISCHARGE DISTANCE: (1)-24mm=372.5mm (3) ROLLER TOLERANCE UPPER LIMIT: 62.8mm

IMAGE FORMING APPARATUS

FIELD OF THE INVENTION AND RELATED ART

The present invention relates to an image forming apparatus, such as a copying machine, a printer, or a facsimile machine, using an electrophotographic type or an electrostatic recording type.

In the image forming apparatus using the electrophotographic type or the like, a blade cleaning type in which toner (transfer residual toner) remaining on a surface of an image bearing member such as a photosensitive member or an intermediary transfer member after a toner image is transferred from the image bearing member onto a toner image receiving member is removed by a cleaning blade has been widely employed. The cleaning blade is a plate-like member formed of an elastic material such as an urethane rubber, and is provided in contact with the surface of the image bearing member so as to extend along a counter direction to a surface movement direction of the image bearing member during image formation. Incidentally, as regards a positional relationship of a contact portion between the image bearing member and the cleaning blade, "upstream" and "downstream" mean "upstream" and "downstream", respectively, with respect to the surface movement direction of the image bearing member during image formation. Further, rotation of the image bearing member in a rotational direction during image formation is referred to as a "normal (forward) rotation", and rotation of the image bearing member in a direction opposite to the rotational direction of the image bearing member is referred to as a "reverse rotation".

In the blade cleaning type, on a side upstream of a cleaning nip which is the contact portion (nip) between the image bearing member and the cleaning blade, a collected toner including the transfer residual toner and a foreign matter such as paper powder is deposited. When image formation is repeated, the foreign matter such as the paper powder contained the deposited collected toner is sandwiched in the cleaning nip in some instances. Therefore, a method in which after the image formation is ended and a normal rotating operation of the image bearing member is ended, the foreign matter such as the paper powder sandwiched in the cleaning nip is removed by performing a reverse rotating operation of the image bearing member has been known (Japanese Laid-Open Patent Application No. 2013-68920).

Incidentally, when the transfer residual toner is scraped off from the image bearing member by the cleaning blade, due to minute vibration or the like of the cleaning blade, toner in a very small amount passes through the cleaning nip and goes around to a back side of the cleaning blade in some instances. Herein, this toner is referred to as "pass-through toner". When the image formation is repeated, the pass-through toner is gradually accumulated on a surface of the cleaning blade opposing the image bearing member on a side downstream of the cleaning nip (herein, this surface is simply referred to as a "back(-side) surface of the cleaning blade"). Then, when the pass-through toner deposited on the back surface of the cleaning blade is deposited (adhered) on the image bearing member and is transferred onto a recording material, there is a possibility that a lateral stripe image which is a latent stripe-like image defect extending along a direction (longitudinal direction of the cleaning blade) substantially perpendicular to a recording material feeding direction generates.

By performing the reverse rotating operation of the image bearing member as described above, a leading end portion of the cleaning blade is stretched by the image bearing member and is changed in attitude, so that the pass-through toner deposited on the back surface of the cleaning blade is pressed against the image bearing member and thus is discharged to the image bearing member. For that reason, in order to suppress that the pass-through toner deposited on the back surface of the cleaning blade is accidentally deposited on an image forming region on the image bearing member and thus the lateral stripe image generates, it is considered that execution of the reverse rotating operation of the image bearing member after an end of the image formation is effective.

However, particularly, during execution of a job in which a high-print ratio image is formed or a job in which the number of sheets subjected to the image formation is large, an amount of the pass-through toner deposited on the back surface of the cleaning blade increases. In such a case, in a single reverse rotating operation, the amount of the pass-through toner discharged on the image bearing member becomes insufficient in some instances. Then, due to the pass-through toner which cannot be completely discharged, there is a possibility that the lateral stripe image continuously generates in subsequent image formation.

In order to solve such a problem, it would be considered that the reverse rotating operation and the normal rotating operation of the image bearing member are repeated a plurality of times so as to sufficiently discharge the pass-through toner deposited on the back surface of the cleaning blade. However, in the case where the reverse rotating operation and the normal rotating operation of the image bearing member are simply repeated a plurality of times, the pass-through toner once discharged is deposited again on the back surface of the cleaning blade, so that there is a possibility that the pass-through toner is accidentally deposited on the image bearing member during subsequent image formation.

SUMMARY OF THE INVENTION

A principal object of the present invention is to suppress generation of the lateral stripe image by effectively removing the pass-through toner deposited on the back surface of the cleaning blade even in the case where the job in which the high-print ratio image is formed or the job in which the number of sheets subjected to the image formation is large is executed.

The object is accomplished by the present invention.

According to an aspect of the present invention, there is provided an image forming apparatus comprising: a rotatable image bearing member configured to bear a toner image on a surface thereof; a transfer member configured to transfer the toner image from the image bearing member rotating in a normal rotational direction onto a toner image receiving member in a transfer portion; a cleaning blade forming a contact portion in contact with the surface of the image bearing member and configured to remove toner from the surface of the image bearing member rotating in the normal rotational direction; a driving portion capable of rotating the image bearing member in the normal rotational direction and a reverse rotational direction opposite to the normal rotational direction; and a controller capable of controlling the driving portion so as to perform a normal rotating operation which is a rotating operation of the image bearing member in the normal rotational direction and a reverse rotating operation of the image bearing member in the reverse rotational direction, wherein the controller is capable of executing an operation in a mode in which the following series of operations is performed when a job for transferring the toner image from the image bearing member onto the toner image receiving member is ended and in which rotation of the image bearing member is stopped after the series of operations is performed, wherein the series of operations is an operation in which an operation such that the normal rotating operation is performed after the reverse rotating operation is performed is executed a plurality of times, and includes a first reverse rotating operation which is the reverse rotating operation executed first in the reverse rotating operations executed in the series of operations, a first normal rotating operation which is the normal rotating operation executed subsequently to the first reverse rotating operation, a second reverse rotating operation executed finally in the reverse rotating operations of the series of operations, and a second normal rotating operation executed subsequently to the second reverse rotating operation, and wherein when a position of the image bearing member positioned in the contact portion at a time of an end of the first reverse rotating operation is a first position, the controller controls the driving portion so that the first position is not returned to the contact portion from an end of the first normal rotating operation to an end of the second normal rotating operation and so that a movement amount of the image bearing member in the second normal rotating operation is smaller than a movement amount of the image bearing member in the second reverse rotating operation.

According to another aspect of the present invention, there is provided an image forming apparatus comprising: a rotatable image bearing member configured to bear a toner image on a surface thereof; a transfer member configured to transfer the toner image from the image bearing member rotating in a normal rotational direction onto a toner image receiving member in a transfer portion; a cleaning blade forming a contact portion in contact with the surface of the image bearing member and configured to remove toner from the surface of the image bearing member rotating in the normal rotational direction; a driving portion capable of rotating the image bearing member in the normal rotational direction and a reverse rotational direction opposite to the normal rotational direction; and a controller capable of controlling the driving portion so as to perform a normal rotating operation which is a rotating operation of the image bearing member in the normal rotational direction and a reverse rotating operation of the image bearing member in the reverse rotational direction, wherein the controller is capable of executing an operation in a mode in which the following series of operations is performed when a job for transferring the toner image from the image bearing member onto the toner image receiving member is ended and in which rotation of the image bearing member is stopped after the series of operations is performed, wherein the series of operations is an operation in which an operation such that the normal rotating operation is performed after the reverse rotating operation is performed is executed a plurality of times, and includes a first reverse rotating operation which is the reverse rotating operation executed first in the reverse rotating operations executed in the series of operations, a first normal rotating operation which is the normal rotating operation executed subsequently to the first reverse rotating operation, a second reverse rotating operation executed finally in the reverse rotating operations of the series of operations, and a second normal rotating operation executed subsequently to the second reverse rotating operation, and wherein when the controller controls the driving portion so that a first movement amount which is a sum of movement amounts of the image bearing member in the normal rotating operations executed after the first reverse rotating operation in the series of operations is larger than a second movement amount which is a sum of movement amounts of the image bearing member in the reverse rotating operations executed after the first reverse rotating operation and so that a movement amount of the image bearing member in the second normal rotating operation is smaller than a movement amount of the image bearing member in the second reverse rotating operation.

Further features of the present invention will become apparent from the following description of exemplary embodiments with reference to the attached drawings.

Figure 3:
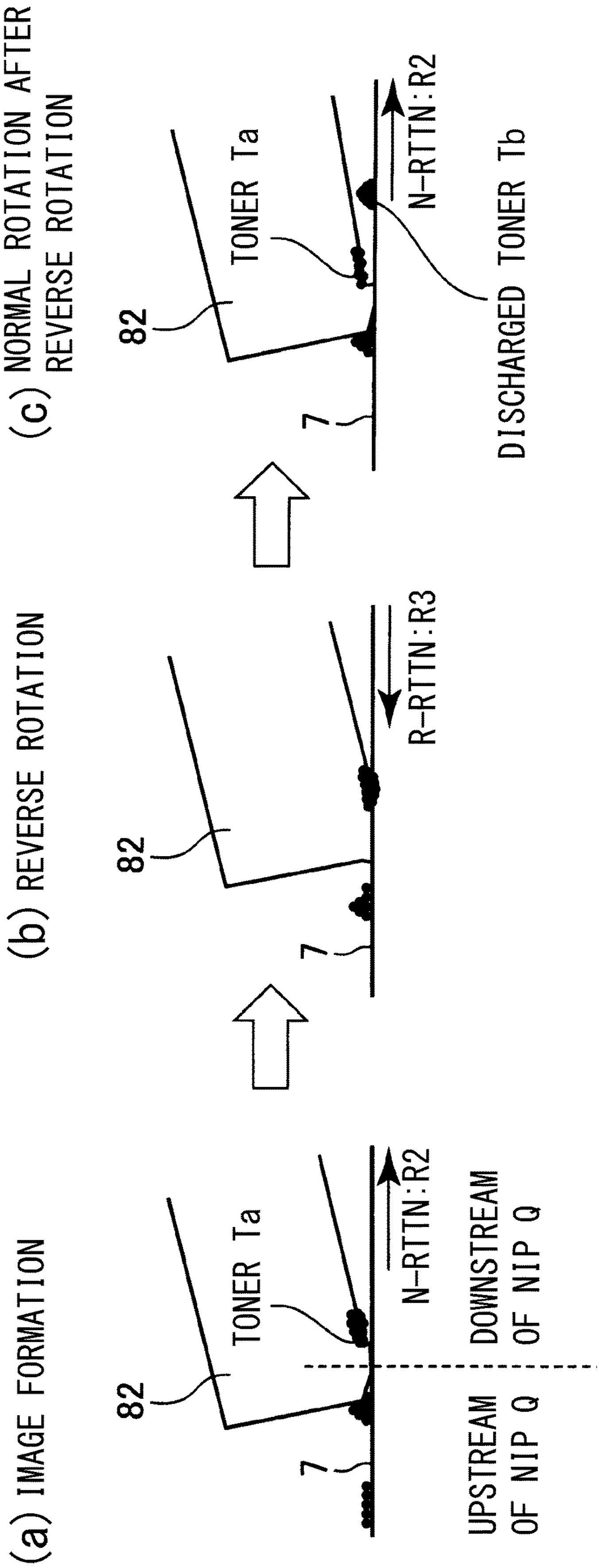

Parts (a) to (c) of FIG. 3 are schematic views for illustrating motion of a pass-through toner.

Figure 4:
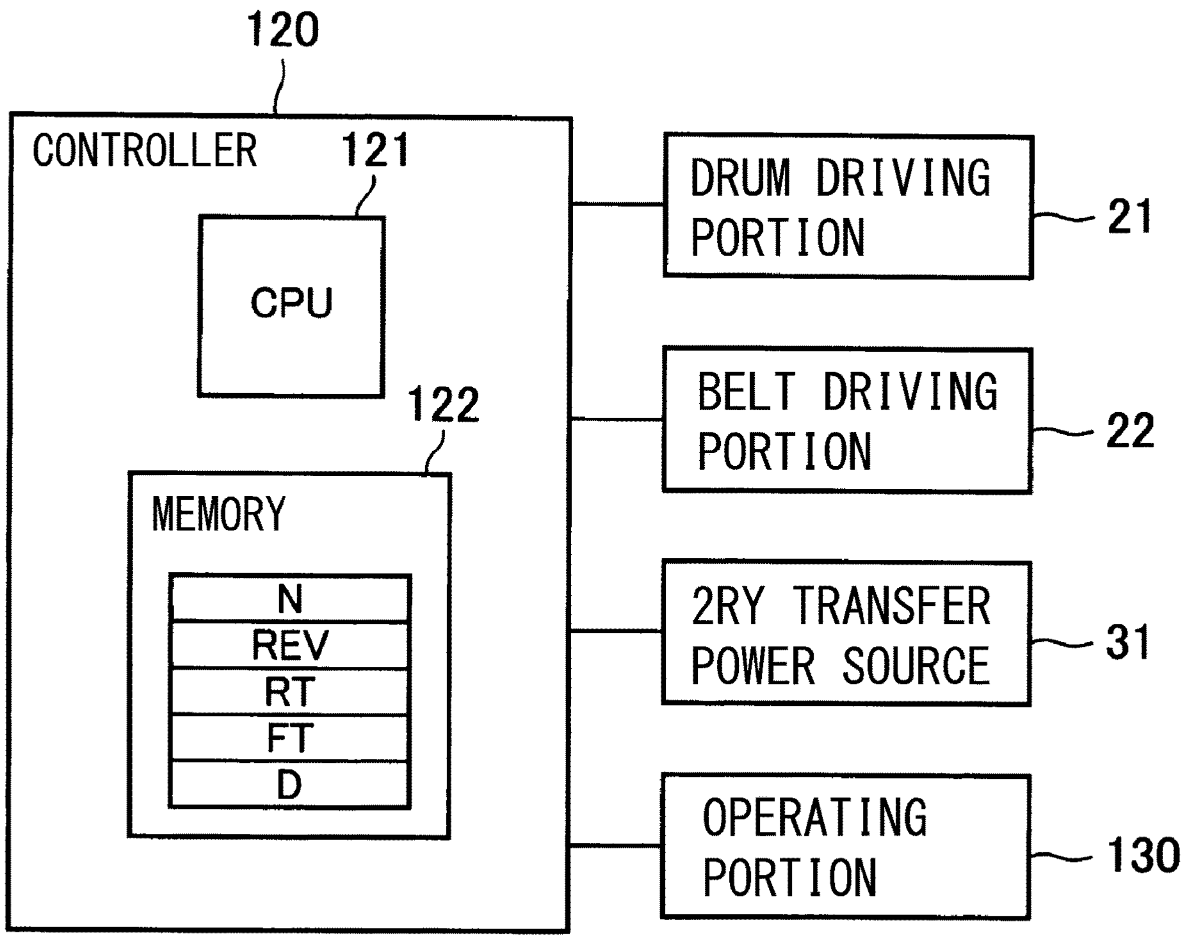

FIG. 4 is a schematic block diagram showing a control mode of the image forming apparatus.

Figure 5:
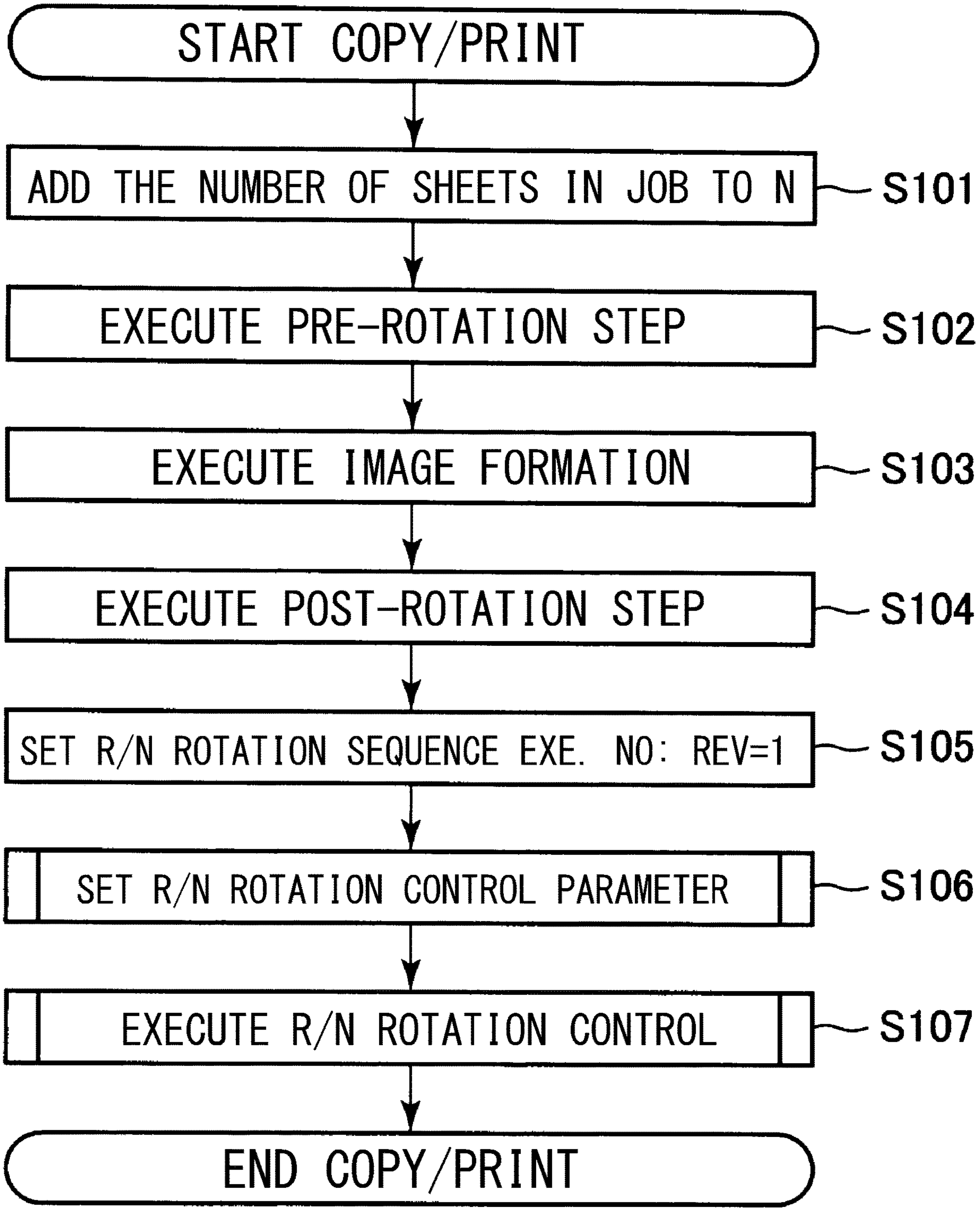

FIG. 5 is a flowchart showing a procedure of a job.

Figure 6:
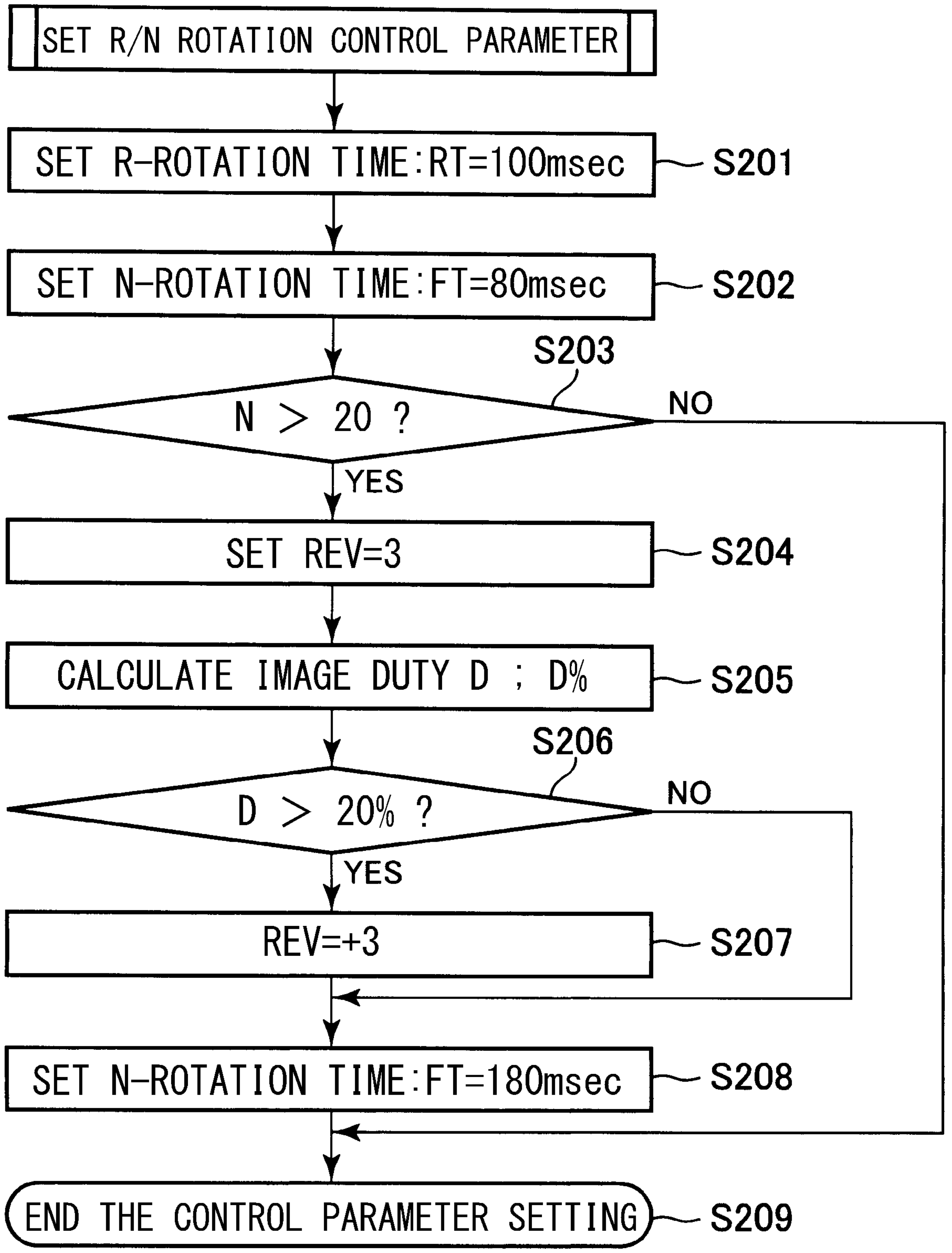

FIG. 6 is a flowchart showing a procedure of setting of reverse and normal rotation control parameter.

Figure 7:
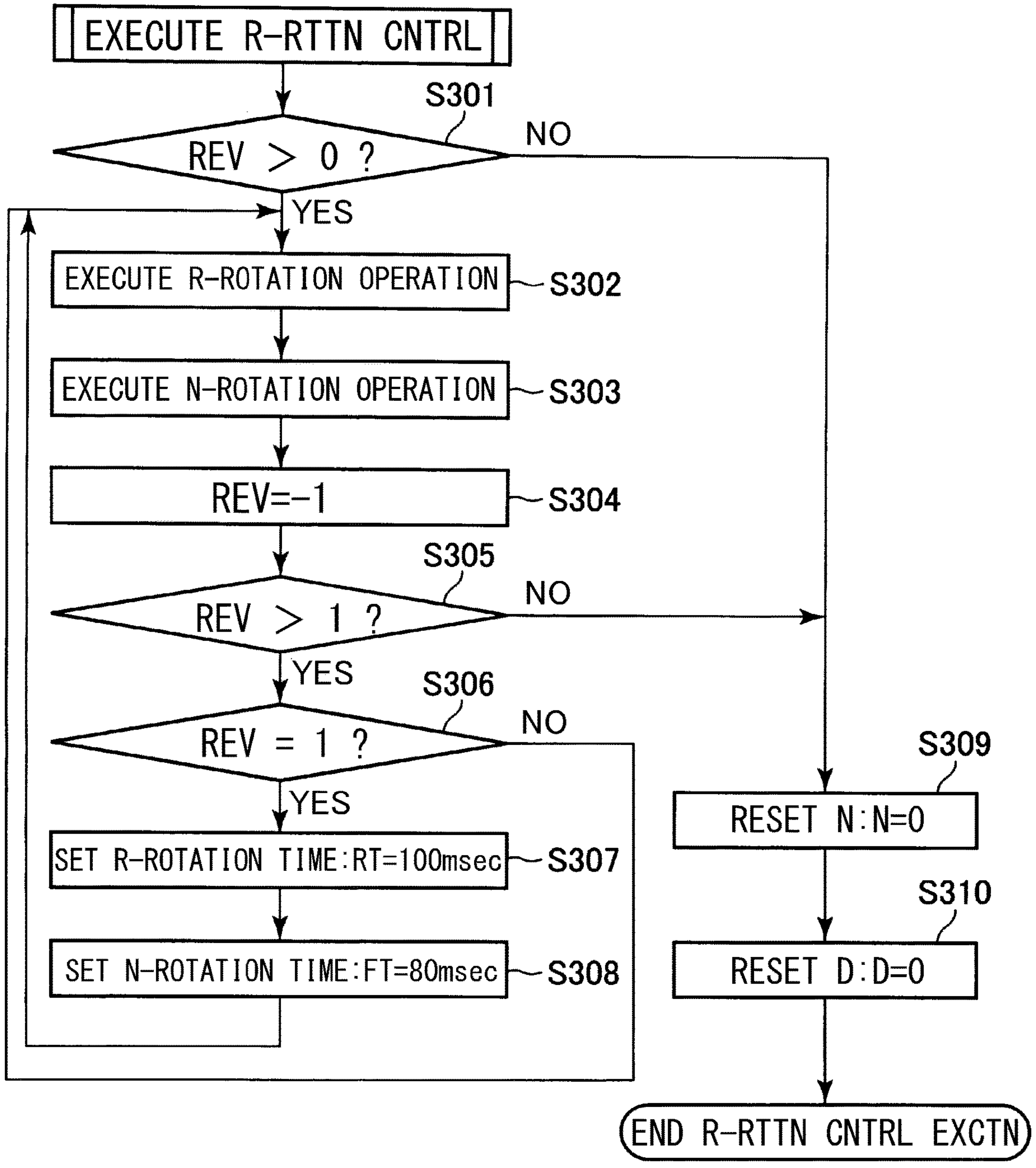

FIG. 7 is a flowchart showing a procedure of reverse and normal rotation control.

Figure 8:
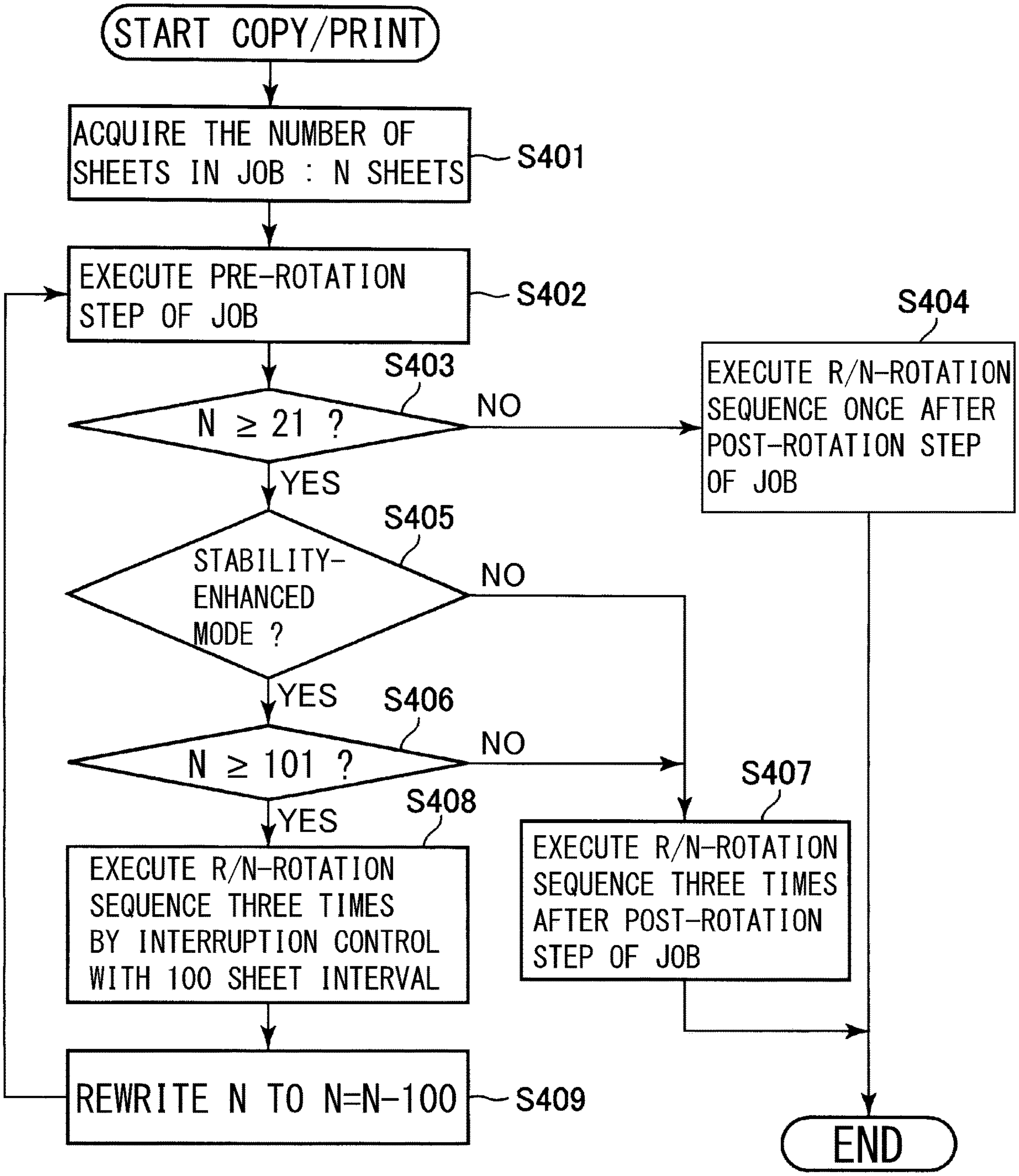

FIG. 8 is a flowchart for illustrating control in an embodiment 2.

Figure 9:
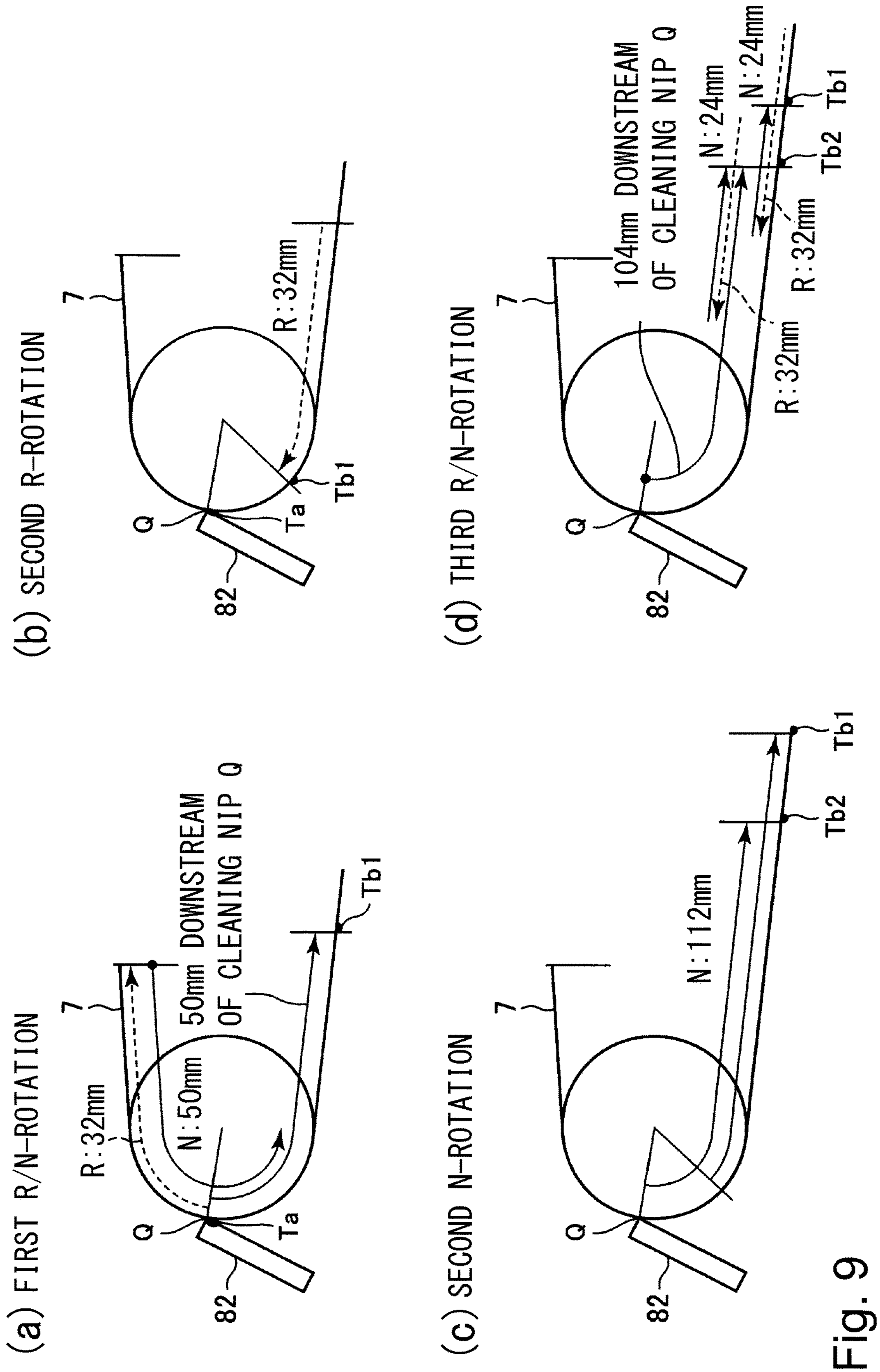

Parts (a) to (d) of FIG. 9 are schematic views for illustrating movement of the pass-through toner.

Figure 10:
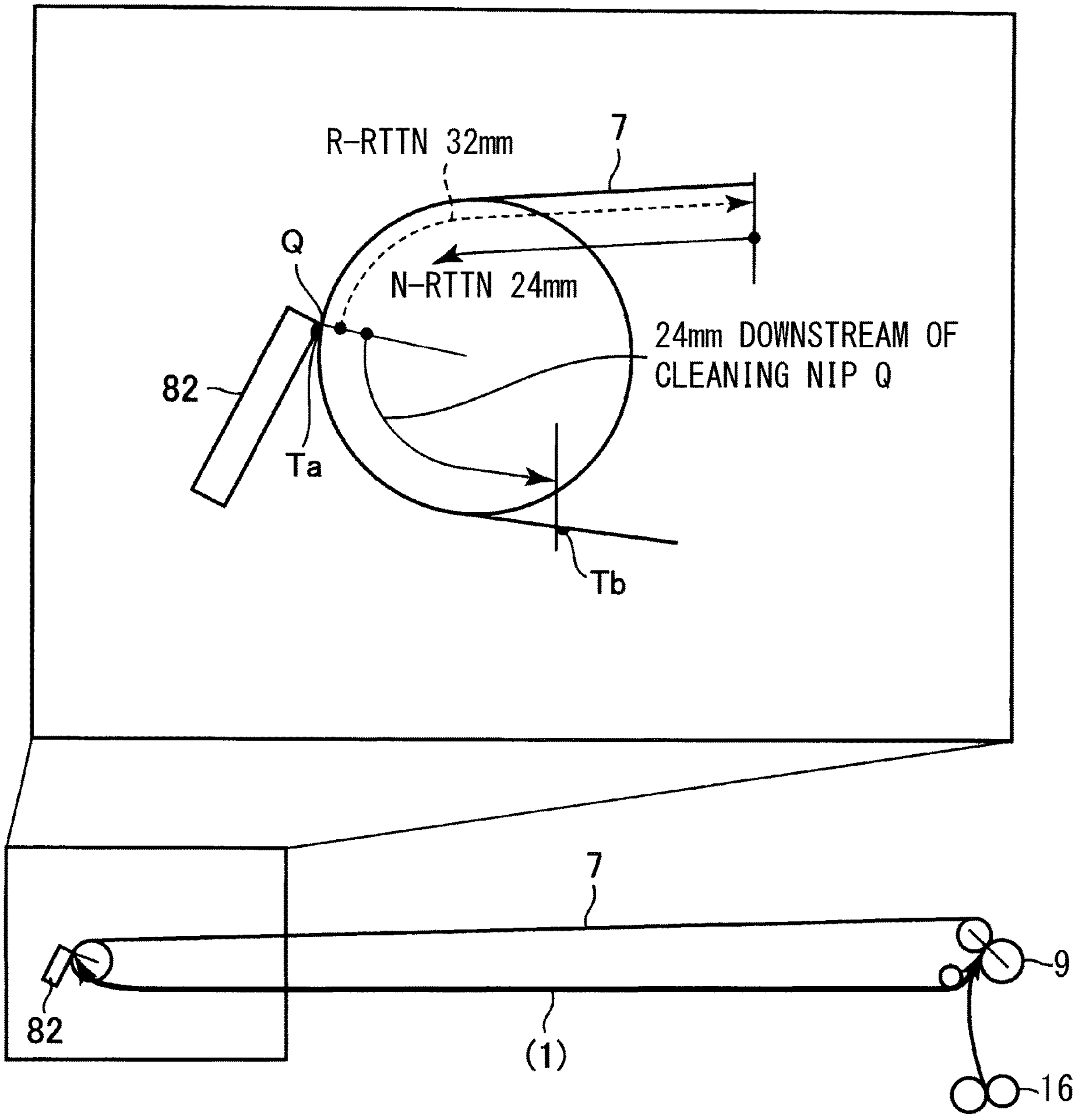

FIG. 10 is a schematic view for illustrating an operation in an embodiment 3.

Figure 11:
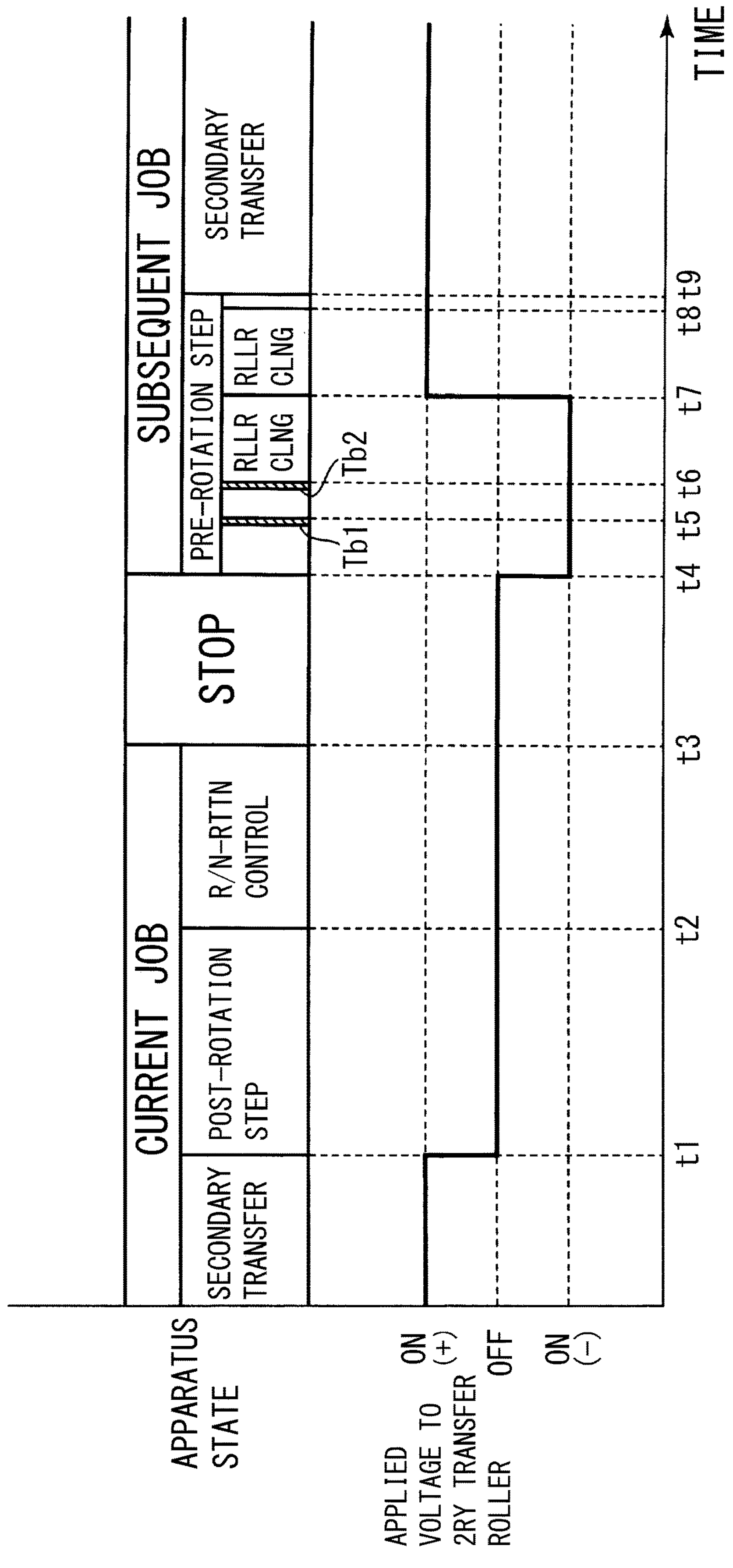

FIG. 11 is a timing chart for illustrating the operation in the embodiment 3.

DESCRIPTION OF THE EMBODIMENTS

In the following, an image forming apparatus according to the present invention will be specifically described with reference to the drawings.

Embodiment 1

1. General Constitution and Operation of Image Forming Apparatus

Figure 1:
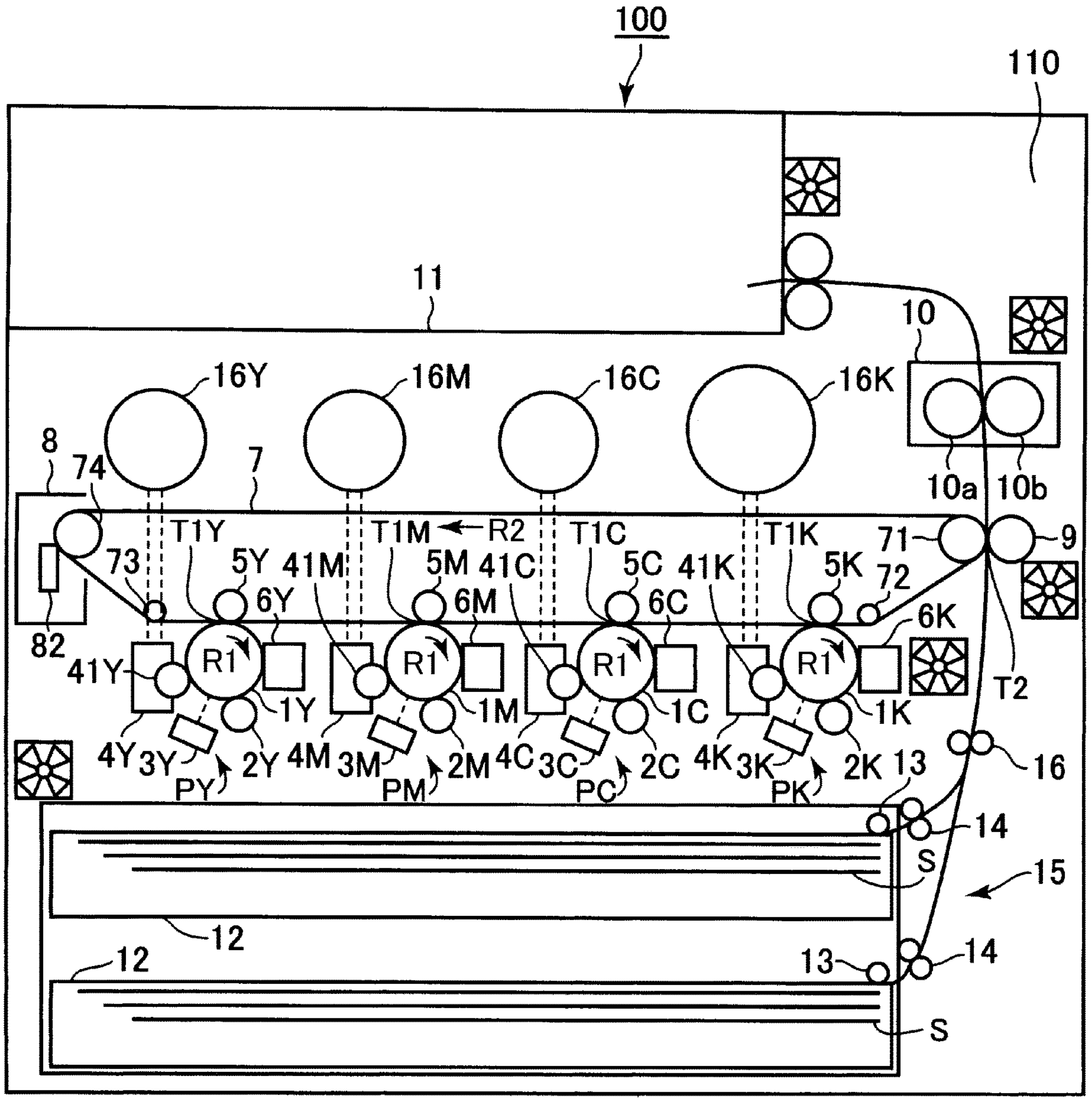
FIG. 1 is a schematic sectional view of an image forming apparatus.

FIG. 1 is a schematic sectional view of an image forming apparatus 100 of an embodiment 1. The image forming apparatus 100 of this embodiment is a tandem laser beam printer which is capable of forming a full-color image with use of an electrophotographic type and which employs an intermediary transfer type.

The image forming apparatus 100 includes, as a plurality of image forming portions (stations), first to fourth image forming portions PY, PM, PC, and PK. The first to fourth image forming portions PY, PM, PC, and PK are provided and arranged linearly in a named order along a movement direction of a surface of an intermediary transfer belt 7 during image formation described later. The first to fourth image forming portions PY, PM, PC, and PK form images of yellow (Y), magenta (M), cyan (C), and black (K), respectively. Incidentally, elements which are provided correspondingly to the image forming portions PY, PM, PC and PK and which have the same or corresponding functions or constitutions are collectively described in some instances by omitting suffixes Y, M, C and K of reference numerals or symbols indicating constituent elements for either of the colors.

The image forming portion P includes a photosensitive drum 1 which is a rotatable drum-shaped (cylindrical) photosensitive member (electrophotographic photosensitive member). The photosensitive drum 1 is rotationally driven in an arrow R1 direction (clockwise direction) in FIG. 1 by a drum driving portion 21 (FIG. 4) as a driving means. The drum driving portion 21 includes a drum driving motor as a driving source, a drive transmitting member, and the like. Around the photosensitive drum 1, the following devices are provided in a named order. First, as a charging means, a charging roller 2 which is a charging member of a roller type. Next, an exposure device (laser scanner) 3 as an exposure means is provided. Next, a developing device 4 as a developing means is provided. Next, a primary transfer roller 5 which is a roller-type primary transfer member as a primary transfer means is provided. Next, a drum cleaning device 6 as a photosensitive member cleaning means is provided.

Further, the image forming apparatus 100 includes the intermediary transfer belt 7 which is constituted by an endless belt as a second image bearing member and which is a rotatable intermediary transfer member. The intermediary transfer belt 7 is extended around, as a plurality of supporting rollers (stretching rollers), a driving roller 71, a first auxiliary roller 72, a second auxiliary roller 73, and a tension roller 74, and is stretched by imparting a predetermined tension thereto. The driving roller 71 is rotationally driven by a belt driving portion 22 (FIG. 4) as a driving means, so that a driving force thereof is transmitted to the intermediary transfer belt 7, and the intermediary transfer belt 7 is rotated (moved and circulated) in an arrow R2 direction (counterclockwise direction) in FIG. 1. The belt driving portion 22 is constituted by including a belt driving motor as a driving source, a drive transmitting member, and the like. The driving roller 71 also function as a secondary transfer opposite roller as an opposing member (opposite electrode) to a secondary transfer roller 9 described later. The first and second auxiliary rollers 72 and 73 form a substantially horizontal image receiving surface of the intermediary transfer belt 7. The tension roller 74 imparts a predetermined tension to the intermediary transfer belt 7. On an inner peripheral surface (back surface) side of the intermediary transfer belt 7, at positions opposing the photosensitive drums 1Y, 1M, 1C, and 1K, the primary transfer rollers 5Y, 5M, 5C, and 5K are provided, respectively. The primary transfer roller 5 is pressed toward the photosensitive drum 1 and is contacted to the photosensitive drum 1 via the intermediary transfer belt 7, so that the primary transfer roller 5 forms a primary transfer portion (primary transfer nip) T1 where the intermediary transfer belt 7 and the photosensitive drum 1 are in contact with each other. The supporting rollers 72 to 74 other than the driving roller 71, and the respective primary transfer rollers 5 are rotated with rotation of the intermediary transfer belt 7. Further, on an outer peripheral surface (front surface) side of the intermediary transfer belt 7, at a position opposing the driving roller 71, the secondary transfer roller 9 which is a roller-type secondary transfer member as a secondary transfer means is provided. The secondary transfer roller 9 is pressed toward the driving roller 71 also functioning as a secondary transfer opposite roller and is contacted to the intermediary transfer belt 7 toward the driving roller 71, and forms a secondary transfer portion (secondary transfer nip) T2 where the intermediary transfer belt 7 and the secondary transfer roller 9 are in contact with each other. The secondary transfer roller 9 may be rotated with rotation of the intermediary transfer belt 7 or may be rotationally driven separately from the intermediary transfer belt 7. Further, on the outer peripheral surface side of the intermediary transfer belt 7, at a position opposing the tension roller 74, the belt cleaning device 8 as the intermediary transfer member cleaning means is provided.

Here, as the intermediary transfer belt 7, one formed using a rubber material or a resin material is widely used. In this embodiment, as the intermediary transfer belt 7, a belt molded in an endless single-layer structure by using PEEK (polyether either ketone) which is the resin material was used. In this embodiment, an electric resistance of the intermediary transfer belt 7 is adjusted so as to be $1\times10^{12}$ [Ω/□] in surface resistivity and $1\times10^{9}$ [Ω·cm] in volume resistivity by dispersing carbon black in a base material of the resin material. Further, onto the surface of the intermediary transfer belt 7, a lubricant is applied for reducing an initial surface friction resistance. As the lubricant, kaina, zinc stearate, or the like is widely used. In this embodiment, onto the surface of the intermediary transfer belt 7, as the lubricant, zinc stearate was applied. The zinc stearate is applied onto the surface of the intermediary transfer belt in a state of a mixture liquid in which powdery zinc stearate is mixed in a volatile solvent (HFE in this embodiment) in a predetermined ratio, so that the zinc stearate can be uniformly applied efficiently onto the surface of the intermediary transfer belt 7.

Further, the image forming apparatus 100 includes a (sheet) feeding portion 15 as a (sheet) feeding means of a recording material S and a fixing device 10 as a fixing means for fixing the toner image onto the recording material, and the like means.

During image formation, the photosensitive drum 1 is rotationally driven, and the surface of the rotating photosensitive drum 1 is charged substantially uniformly to a predetermined polarity (negative in this embodiment) and to a predetermined potential. During charging, to the charging roller 2, a predetermined charging voltage (charging bias) is applied from a charging power source (not shown) as a charging voltage applying means (charging voltage applying portion). Incidentally, with respect to a surface movement direction of the photosensitive drum 1 during image formation, on each of sides upstream and downstream of a contact portion between the photosensitive drum 1 and the charging roller 2, a minute gap between the photosensitive drum 1 and the charging roller 2 is formed. The charging roller 2 electrically charges the surface of the photosensitive drum 1 by electric discharge generating in at least one of these gaps on the sides upstream and downstream of the contact portion.

The charged surface of the photosensitive drum 1 is subjected to scanning exposure by being irradiated with laser light on the basis of image information by the exposure device 3, so that an electrostatic latent image (electrostatic image) is formed on the photosensitive drum 1. The electrostatic latent image formed on the photosensitive drum 1 is developed (visualized) by being supplied with the toner as a developer by the developing device 4, so that a toner image (developer image) is formed on the photosensitive drum 1. The developing device 4 includes a developing roller 41 as a developer carrying member for feeding (conveying) the time image to a portion opposing the photosensitive drum 1 while carrying the toner image thereon. During development, to the developing roller 41, a predetermined developing voltage (developing bias) is applied from a developing power source (not shown) as a developing voltage applying means (developing voltage applying portion). In this embodiment, to the developing roller 41, as the developing voltage, an oscillating voltage in the form of superimposition of a DC voltage and an AC voltage is applied. In this embodiment, the toner image is formed by image portion exposure and reverse development. That is, on an exposure portion (image portion) on the photosensitive drum 1 where an absolute value of the potential is lowered by the exposure to light after the photosensitive drum surface is substantially uniformly charged, the toner charged to the same polarity (negative in this embodiment) as a charge polarity of the photosensitive drum 1. In this embodiment, a normal charge polarity of the toner which is a principal charge polarity of the toner during the development is the negative polarity.

The toner image formed on the photosensitive drum 1 is transferred (primary-transferred) onto the intermediary transfer belt 7 as a rotating toner image receiving member by the action of the primary transfer roller 5 in the primary transfer portion T1. During primary transfer, to the primary transfer roller 5, a predetermined primary transfer voltage (primary transfer bias) which is a DC voltage of an opposite polarity (positive in this embodiment) to the normal charge polarity of the toner is applied from a primary transfer power source (not shown) as a primary transfer voltage applying means (primary transfer voltage applying portion). For example, during full-color image formation, the toner images of yellow, magenta, cyan, and black formed on the respective photosensitive drums 1 are transferred superposedly in the respective primary transfer portions T1.

The toner images formed on the intermediary transfer belt 7 are transferred (secondary-transferred) onto the recording material S as a toner image receiving member nipped and conveyed between the intermediary transfer belt 7 and the secondary transfer roller 9 by the action of the secondary transfer roller 9 in the secondary transfer portion T2. During secondary transfer, to the secondary transfer roller 9, a predetermined secondary transfer voltage (secondary transfer bias) which is a DC voltage of an opposite polarity (positive in this embodiment) to the normal charge polarity of the toner is applied from a secondary transfer power source 31 (FIG. 4) as a secondary transfer voltage applying means (secondary transfer voltage applying portion). Incidentally, in this embodiment, the driving roller 71 is electrically grounded. The recording material (transfer receiving material, a recording medium, sheet) S is fed from the feeding portion and supplied to the secondary transfer portion T2. The feeding portion 15 is constituted by including a cassette 12, a feeding roller (pick-up roller) 13, a conveying roller 14, and the like. Incidentally, as the recording material S, for example, plain paper, a synthetic resin sheet, an envelope, and the like are used, but in this embodiment, the recording material S will be described as the plain paper. The recording material S is accommodated in the cassette 12 which is an accommodating portion. The cassette 12 is provided at a lower portion of an apparatus main assembly 110 so as to be detachably mountable to the apparatus main assembly 110. The recording materials S are separated and fed one by one from the cassette 12 by the feeding roller 13 and the like. The recording material S fed from the cassette 12 is conveyed to a registration roller pair 16 by a conveying roller pair 14 as a conveying member. This recording material S is conveyed to the secondary transfer portion T2 by the registration roller pair 16 by being timed to the toner images on the intermediary transfer belt 7.

The recording material S on which the toner images are secondary-transferred is conveyed to the fixing device 10. The fixing device 10 is constituted by including a fixing roller (heating roller) 10*a* as a fixing member and a pressing roller 10*b* as a pressing member press-contacted to the fixing roller 10*a*. The fixing device 10 heats and presses the recording material S on which the unfixed toner image is carried, and fixes (melts, sticks) the toner image on the recording material S. A temperature of the fixing device 10 is determined on the basis of a detection result of an environment sensor (not shown) and setting of a paper kind (kind of the recording material S). In general, when a process speed is the same, the temperature of the fixing device 10 is set at a higher value with a lower environmental temperature and with a larger basis weight of paper set as the paper kind. In this embodiment, as the paper kind, plain paper 1, plain paper 2, plain paper 3, and the like are settable. For example, basis weights of the plain paper 1, the plain paper 2, and the plain paper 3 are 64 to 75 g/m$^2$, 76 to 90 g/m$^2$, and 91 to 105 g/m$^2$, respectively, and the set temperatures of the fixing device 10 for these paper kinds in the environmental temperature of 23° C. are 190° C., 200° C., and 210° C., respectively. The recording material S passes through the fixing device 10, and then is discharged (outputted) to a discharge tray 11 provided outside the apparatus main assembly 110 of the image forming apparatus 100.

Further, the surface of the photosensitive drum 1 after a primary transfer step is cleaned by the drum cleaning device 6. The drum cleaning device 6 scrapes off and removes a deposited matter such as the primary transfer residual toner from the surface of the rotating photosensitive drum 1 by a cleaning blade (not shown) provided in contact with the photosensitive drum 1, and then collects the deposited matter in a collecting container. Further, the surface of the intermediary transfer belt 7 after a secondary transfer step is cleaned by the belt cleaning device 8. The belt cleaning device 8 scrapes off and removes a deposited matter such as the secondary transfer residual toner from the surface of the rotating intermediary transfer belt 7 by the cleaning blade 82 provided in contact with the intermediary transfer belt 7, and then collects the deposited matter in a collecting container. The belt cleaning device 8 will be specifically described later.

By the above-described operations, a series of image forming processes is ended. Further, the toner in an amount corresponding to a consumed amount of the toner is supplied from a toner bottle 16 to the developing device 4.

2. Belt Cleaning Device

Figure 2:
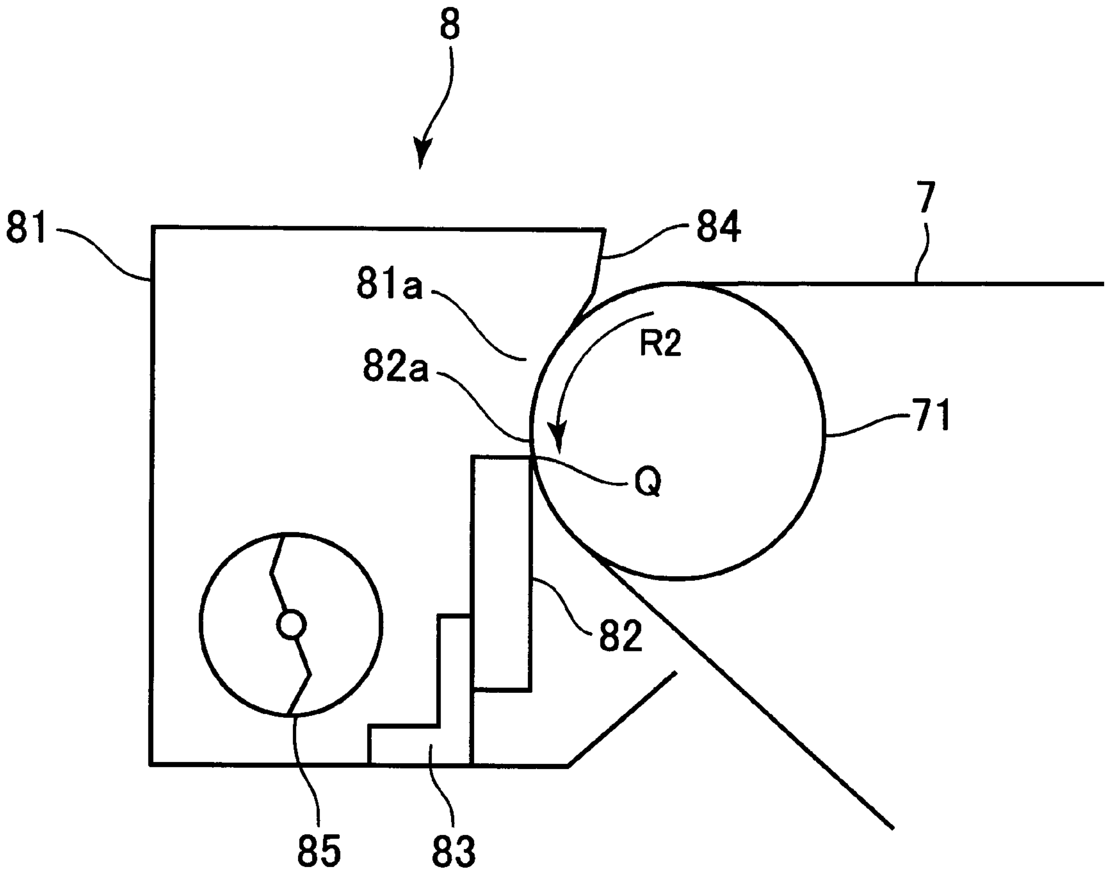
FIG. 2 is a schematic sectional view of a neighborhood of a belt cleaning device.

Next, the belt cleaning device 8 in this embodiment will be further described. FIG. 2 is a schematic sectional view showing a portion in the neighborhood of the belt cleaning device 8 (sectional view substantially perpendicular to a rotational axis direction of the supporting roller for the intermediary transfer belt 7).

The belt cleaning device 8 includes a collecting container (casing) 81 device within an opening 81*a* on the intermediary transfer belt 7 side. In the cleaning container 81, the cleaning blade 82 is mounted via a supporting member 83 so as to face the opening 81*a*. The cleaning blade 82 is a plate-like member which has a predetermined thickness and a predetermined length with respect to each of a longitudinal direction disposed along a direction (widthwise direction of the intermediary transfer belt 7) substantially perpendicular to a surface movement direction of the intermediary transfer belt 7 and a short(-side) direction perpendicular to the longitudinal direction. In this embodiment, the cleaning blade is formed of an urethane rubber as an elastic material. The cleaning blade 82 is fixed to the supporting member 83 at one end portion (base end portion) with respect to the short direction thereof, and this supporting member 83 is fixed to the collecting container 81. Further, the cleaning blade 82 is contacted to the surface of the intermediary transfer belt 7 so that an outside edge portion of a free end on the other end portion (free end portion) side with respect to the short direction thereof extends along the counter direction to the surface movement direction of the intermediary transfer belt 7 during image formation. That is, the cleaning blade 82 is contacted to the surface of the intermediary transfer belt 7 so that the free end on the free end portion side faces an upstream side with respect to the surface movement direction. A contact portion between the cleaning blade 82 and the intermediary transfer belt 7 is a cleaning nip (cleaning portion) Q.

Further, the cleaning container 81 is provided with a scooping sheet 84 as a contact member so as to face the opening 81*a* on a side upstream of the cleaning blade 82 with respect to the surface movement direction of the intermediary transfer belt 7 during image formation. The scooping sheet 84 is a sheet-like member which as a predetermined thickness and a predetermined length with respect to each of a longitudinal direction along a direction substantially perpendicular to the surface movement direction of the intermediary transfer belt 7 and a short(-side) direction perpendicular to the longitudinal direction. In this embodiment, the scooping sheet 84 is formed of a flexible plastic sheet. The scooping sheet 84 is fixed to and supported by the collecting container 81 at one end portion (base end portion) with respect to the short direction. Further, the scooping sheet 84 contacts the intermediary transfer belt 7 at a free end on the other end portion (free end portion) with respect to the short direction. The scooping sheet 84 contacts the intermediary transfer belt 7 so that the free end on the free end side faces a downstream side with respect to the surface movement direction of the intermediary transfer belt 7 during image formation. The scooping sheet 84 not only drops the toner scraped off by the cleaning blade 82 into the cleaning container 81 but also suppress a back flow of the toner toward the intermediary transfer belt 7 side.

Further, inside the collecting container 81, a feeding screw 85 as a feeding member for feeding the toner collected in the collecting container 81 is provided. The feeding screw 85 feeds the toner collected in the collecting container 81 in a direction substantially perpendicular to the surface movement direction of the intermediary transfer belt 7 and discharges the toner from the collecting container 81 toward a collected toner box (not shown) provided separately in the image forming apparatus 100.

3. Developer

In this embodiment, the developing device 4 develops the electrostatic latent image on the photosensitive drum 1 with use of a two-component developer in which a carrier (magnetic) and toner (non-magnetic) are mixed. In this embodiment, a developer in which the carrier and the toner are mixed in a weight ratio of 91:9 (toner content: 9%) was used. Further, in this embodiment, a total weight of an initial developer accommodated in the developing device 4 was 208 g.

In this embodiment, as the carrier, a carrier prepared by coating ferrite particles with a silicone resin was used. This carrier is 24 [$Am^2/kg$] in saturation magnetization to an applied magnetic field of 240 [kA/m]. Further, this carrier is $1\times10^7$ [Ω·cm] to $1\times10^8$ [Ω·cm] in specific resistance (resistivity) in a field intensity of 3000 [V/cm]. Further, this carrier is 50 μm in weight-average particle size.

The toner contains a binder resin, a colorant, and a charge control agent. In this embodiment, as a binder resin, a styrene-acrylic resin is used. However, as the binder resin, it is also possible to use a styrene-based resin, a polyester-based resin, polyethylene, and the like. As the colorant, various pigments, various dyes, and the like may be used singly or in combination of a plurality of kinds. The charge control agent may contain a charge controller for reinforcement as desired. As the charge controller for reinforcement, it is possible to utilize a nigrosine-based dye, a triphenylmethane-based dye, and the like.

Further, the toner contains a wax. The wax is contained in the toner for improving a parting property from a fixing member during fixing and for improving a fixing property. As the wax, it is possible to use a paraffin wax, a carnauba wax, polyolefin wax, and the like. The wax can be used by being kneaded and dispersed in the binder resin. In this embodiment, as the toner, toner prepared by pulverizing a resin material in which the binder resin, the charge control agent, and the wax are kneaded and dispersed, by a mechanical pulverizer was used. A melting point of the wax used in this embodiment is 100° C. or less.

Further, the toner contains an external additive. As the external additive, it is possible to cite inorganic oxide fine particles such as hydrophobized amorphous silica or a titanium compound (for example, titanium oxide). These fine particles can be added to the toner and can adjust power flowability and a charging amount of the toner. A particle size of the particles of the external additive may preferably be 1 nm or more and 100 nm or less. In this embodiment, the titanium oxide of 50 nm in average particle size was added to the toner in a weight ratio of 0.5 wt. %, and each of the amorphous silica fine particles of 2 nm and 100 nm in average particle size was added in a weight ratio of 0.5 wt. %.

When the particle size of the toner constituted as described above was measured by a powder particle size image analysis system ("FPIA-3000", manufactured by Sysmex Corp.), a weight-average particle size was 6.6 μm.

4. Lateral Stripe Image Due to Pass-Through Toner on Cleaning Blade

Next, a lateral stripe image due to the pass-through toner on the cleaning blade 82 will be described.

Parts (a) to (c) of FIG. 3 are schematic views (sectional views substantially perpendicular to a rotational axis direction of the supporting roller for the intermediary transfer belt 7) for illustrating motion of the pass-through toner on the cleaning blade 82. Herein, a rotation of the intermediary transfer belt 7 in a rotational direction (arrow R2 direction in FIG. 3) during normal image formation is referred to as a "normal rotation", and a direction thereof is referred to as a "normal rotational direction". Further, a rotation of the intermediary transfer belt 7 in an opposite direction (arrow R3 direction in FIG. 3) to the rotational direction during normal image formation is referred to as a "reverse rotation", and a direction thereof is referred to as a "reverse rotational direction". Incidentally, these are also true for the rotation of the photosensitive drum 1. Further, herein, with respect to a positional relationship with respect to the cleaning nip Q, "upstream" and "downstream" mean "upstream" and "downstream", respectively, with respect to the normal rotational direction of the intermediary transfer belt 7. That is, an upstream side of the cleaning nip Q with respect to the rotational direction in which the intermediary transfer belt 7 contacts the cleaning blade 82 in the counter direction is also simply referred to as an "upstream side of the cleaning nip Q". Further, a downstream side of the cleaning nip Q with respect to the rotational direction in which the intermediary transfer belt 7 contacts the cleaning blade 82 in the counter direction is also simply referred to as a "downstream side of the cleaning nip Q".

First, although most of the toner on the intermediary transfer belt 7 is transferred onto the recording material S setting secondary transfer, the toner (secondary transfer residual toner) which is a part of the toner on the intermediary transfer belt 7 and which cannot be completely transferred remains on the intermediary transfer belt 7 after secondary transfer. This secondary transfer residual toner is carried to the belt cleaning device 8 and is scraped off from the intermediary transfer belt 7. The toner scraped off from the intermediary transfer belt 7 is collected in the collecting container 81. The toner collected in the collecting container 81 is fed by the feeding screw 85 and is discharged from the collecting container 81, and thus is conveyed to a collecting toner box (not shown).

During scraping-off of the secondary transfer residual toner from the intermediary transfer belt 7 by the cleaning blade 82, the toner in a very small amount goes around to the back side of the cleaning blade 82 through a gap generated by minute vibration of the intermediary transfer belt 7 or the cleaning blade 82 in some instances.

Herein, the toner is referred to as "pass-through toner Ta". When the image formation is continued, as shown in part (a) of FIG. 3, the pass-through toner Ta is gradually accumulated on a surface ("back(-side) surface of the cleaning blade 82" of the cleaning blade 82 opposing the intermediary transfer belt 7 on the downstream side of the cleaning nip Q. That is, when the intermediary transfer belt 7 is normally rotated, the cleaning blade 82 is bent so that the outside edge portion 82*a* of the free end of the cleaning blade 82 is pressed toward the downstream side by the intermediary transfer belt 7. The pass-through toner Ta is gradually deposited and accumulated on the back surface of the cleaning blade 82 so as to be surrounded by this bent portion. Then, when the pass-through toner Ta deposited on the back surface of the cleaning blade 82 is deposited on the intermediary transfer belt 7 and then is transferred onto the recording material S, there is a possibility that the lateral stripe image which is a lateral stripe-like image defect along the direction substantially perpendicular to the feeding direction of the recording material S generates.

Further, on the upstream side of the cleaning nip Q, the collected toner containing the secondary transfer residual toner and a foreign matter such as paper powder is deposited. When the image formation is continued, the foreign matter such as the paper powder or a wax component enters, the cleaning nip Q and is nipped in the cleaning nip Q in some instances. Then, the nipped foreign matter deforms the cleaning blade 82 so as to locally pushes up the cleaning blade 82, so that the toner passes through the deformed portion of the cleaning blade 82 and thus improper cleaning occurs in some cases.

In order to remove the foreign matter such as the paper powder or the wax component nipped in the cleaning nip Q, execution of the reverse rotating operation of the intermediary transfer belt 7 is effective. When the reverse rotating operation of the intermediary transfer belt 7 is executed (performed), as shown in part (b) of FIG. 3, the foreign matter such as the paper powder or the wax component nipped in the cleaning nip Q is released from the cleaning nip Q.

On the other hand, as shown in part (b) of FIG. 3, by executing the reverse rotating operation of the intermediary transfer belt 7, the free end portion of the cleaning blade 82 is stretched toward the upstream side and is deformed by the intermediary transfer belt 7. By this, the pass-through toner Ta deposited on the back surface of the cleaning blade 82 is pressed against the intermediary transfer belt 7 and is deposited on the intermediary transfer belt 7.

Further, after the reverse rotating operation of the intermediary transfer belt 7 is performed, when the rotation of the intermediary transfer belt 7 is stopped and the intermediary transfer belt 7 is left standing as it is, load different from a load exerted during normal image formation is exerted on the cleaning blade 82. For that reason, there is a liability that improper cleaning due to the deformation of the cleaning blade 82 occurs. Incidentally, in the case where the reverse rotating operation of the photosensitive drum 1 is performed with the reverse rotating operation of the intermediary transfer belt 7, when the rotation of the photosensitive drum 1 is stopped after the reverse rotating operation is performed and then the photosensitive drum 1 is left standing as it is, a load different from a load exerted during normal image formation is exerted on the cleaning roller 2. For that reason, there is a liability that improper charging due to the deformation of the charging roller 2 occurs. Accordingly, as shown in part (c) of FIG. 3, after the reverse rotating operation of the intermediary transfer belt 7 is performed, the normal rotating operation of the intermediary transfer belt 7 is performed, and then the rotation of the intermediary transfer belt 7 is stopped. At this time, as shown in part (c) of FIG. 3, a part of the pass-through toner Ta deposited on the intermediary transfer belt 7 during the reverse rotating operation is discharged on and conveyed by the intermediary transfer belt 7 with the normal rotating operation of the intermediary transfer belt 7. Herein, the pass-through toner Ta discharged from the back surface of the cleaning blade 82 onto the intermediary transfer belt 7 in such a mechanism is also referred to as "discharged toner Tb". For that reason, in order to suppress that the lateral stripe image is generated by accidental deposition of the pass-through toner Ta, deposited on the back surface of the cleaning blade 82, in an image forming region on the intermediary transfer belt 7 during image formation, it would be considered that the execution of the reverse rotating operation of the intermediary transfer belt 7 after an end of the image formation is effective.

However, particularly, during execution of a job in which a high-print ratio image is formed or a job in which the number of sheets subjected to image formation, an amount of the pass-through toner Ta deposited on the back surface of the cleaning blade 82 increases. In such a case, in the above-described single execution of the normal rotating operation and the reverse rotating operation, the amount of the pass-through toner Ta discharged to the intermediary transfer belt 7 becomes insufficient in some instances. Thus, due to the pass-through toner Ta which cannot be completely discharged, there is a possibility that the lateral stripe image continuously generates in subsequent image formation.

In order to solve such a problem, it would be considered that the above-described deformation of the free end portion of the cleaning blade 82 is repetitively carried out and thus the reverse rotating operation and the normal rotating operation of the intermediary transfer belt 7 are repeated a plurality of times so as to sufficiently discharge the pass-through toner Ta deposited on the back surface of the cleaning blade 82. However, in the case where the reverse rotating operation and the normal rotating operation of the intermediary transfer belt 7 are simply repeated the plurality of times, the pass-through toner Ta once discharged is deposited again on the back surface of the cleaning blade 82, so that there is a possibility that the pass-through toner Ta is then accidentally deposited on the intermediary transfer belt 7 during the subsequent image formation.

Therefore, in this embodiment, on the basis of an accumulation amount of the pass-through toner Ta estimated from the number of sheets subjected to the image formation in the job, after an end of the image formation, the reverse rotating operation and the normal rotating operation are executed a plurality of times. Herein, a set of the reverse rotating operation of the intermediary transfer belt 7 and the subsequent normal rotating operation of the intermediary transfer belt 7 is referred to as "reverse and normal rotating sequence". A single reverse and normal rotating sequence is constituted by a single reverse rotating operation and a single normal rotating operation. For example, execution of the reverse and normal rotating sequence three times refers to rotations of the intermediary transfer belt 7 executed in the order of a first reverse rotating operation, a first normal rotating operation, a second reverse rotating operation, a second normal rotating operation, a third reverse rotating operation, and a third normal rotating operation. Further, herein, control in which this reverse and normal rotating sequence is executed single time (once) or continuously a plurality of times at one execution timing is referred to as "reverse and normal rotation control". The above-described one execution timing at which this reverse and normal rotation control is executed is after an end of the image formation in this embodiment (specifically, after an end of the post-rotation of the job), but may also be during a sheet interval step (see embodiment 2). Further, in this embodiment, in the case where the reverse and normal rotating sequence is continuously executed the plurality of times, in the normal rotating operation subsequent to the reverse rotating operation, the intermediary transfer belt 7 is moved in a movement amount (normal rotation distance) more than a movement amount (reverse rotation distance) of the intermediary transfer belt 7 in a subsequent reverse rotating operation. By doing so, it is possible to prevent that the pass-through toner Ta once discharged is returned to the cleaning blade nip Q and is deposited again on the back surface of the cleaning blade 82. Thus, in this embodiment, the reverse and normal rotating sequence is executed the plurality of times, so that not only the pass-through toner Ta deposited on the back surface of the cleaning blade 82 can be effectively discharged, but also deposition of the once discharged pass-through toner Ta on the back surface of the cleaning blade 82 again can be prevented. By this, even in the case where the job in which the high-print ratio image is formed and the job in which the number of sheets subjected to image formation is large are executed, the pass-through toner Ta deposited on the back surface of the cleaning blade 82 is effectively removed, so that the generation of the lateral stripe image can be suppressed. The reverse and normal rotation control in this embodiment will be further described specifically below.

Incidentally, although not shown in FIG. 3, in this embodiment, when the intermediary transfer belt 7 is normally rotated, the photosensitive drum 1 is also normally rotated (in the arrow R1 direction in FIG. 1) in synchronism with the intermediary transfer belt 7. Further, when the intermediary transfer belt 7 is reversely rotated, the photosensitive drum 1 is also reversely rotated (in the direction opposite to the arrow R1 direction in FIG. 1). This is because abrasion (wearing) and the like of the intermediary transfer belt 7 and the photosensitive drum 1 due to friction (slide) between the intermediary transfer belt 7 and the photosensitive drum 1.

5. Effective Discharge of Pass-Through Toner

Next, an experiment conducted for verifying setting for performing effective discharge of the pass-through toner Ta will be described.

First, a job in which predetermined images each with a print ratio (image duty, image ratio) of 5% are continuously formed on one surface of A4-size recording materials S in a predetermined number of sheets is executed. Further, an experiment such that the reverse and normal rotating sequence is executed a predetermined number of times after an end of the post-rotation step of the job was conducted. After an end of the experiment, whether or not after the end of the experiment, the pass-through toner Ta deposited on the back surface of the cleaning blade 82 can be removed by being discharged onto the intermediary transfer belt 7 by the reverse and normal rotating sequence (whether or not there is a remaining amount of the pass-through toner Ta) was checked. A result is shown in a table 1, in which "○" represents that the pass-through toner Ta is removed (i.e., there is no remaining amount of the pass-through toner Ta), and "x" represents that the pass-through toner Ta is not removed (i.e., there is a remaining amount of the pass-through toner Ta).

TABLE 1

| | NOCPS*[2] (A4: ONE SIDE) | | | | | |
|---|---|---|---|---|---|---|
| RNRS*[1] | 10 | 20 | 50 | 100 | 150 | 200 |
| one time | ○ | ○ | x | x | x | x |
| three times | ○ | ○ | ○ | ○ | x | x |
| five times | ○ | ○ | ○ | ○ | ○ | ○ |

*[1]"RNRS" is the reverse and normal rotating sequence.
*[2]"NOCPS" is the number of continuously passed sheets.

In the case where the number of sheets (subjected to image formation) in the job is small, by executing the reverse and normal rotating sequence one time after the end of the post-rotation step of the job, there was no remaining amount of the pass-through toner Ta. However, in the case where the number of sheets in the job is large such as 50 sheets or more, even when the reverse and normal rotating sequence is executed one time after the end of the post-recording material step, there was a remaining amount of the pass-through toner Ta.

On the other hand, by executing the reverse and normal rotating sequence five times after the end of the post-rotation step in the job, even in the case where the number of sheets in the job is large such as 200 sheets, there was no remaining amount of the pass-through toner Ta. Incidentally, as described above, the execution of the reverse and normal rotating sequence five times refers to the end of the reverse and normal rotating sequence by execution of rotations of the intermediary transfer belt 7 in the order of the first reverse rotating operation, the first normal rotating operation, the second reverse rotating operation, the second normal rotating operation, the third reverse rotating operation, the third normal rotating operation, the fourth reverse rotating operation, the fourth normal rotating operation, the fifth reverse rotating operation, and the fifth normal rotating operation. In the case where the reverse and normal rotating sequence is executed three times after the end of the post-rotation step of the job, a result thereof was a result corresponding to an intermediary result between those in the case where the reverse and normal rotating sequence was executed one time end the case where the reverse and normal rotating sequence was executed five times.

Thus, it is understood that an accumulation amount of the pass-through toner Ta becomes large when the number of sheets in the job is large. Incidentally, even in the case where the print ratio of the image to be formed is high, there is a tendency that the accumulation amount of the pass-through toner Ta becomes large. Further, it is understood that the pass-through toner Ta deposited on the back surface of the cleaning blade 82 is easily discharged by increasing the number of times of execution of the reverse and normal rotating sequence in the post-rotation step of the job.

6. Control Mode

FIG. 4 is a schematic block diagram showing a control mode of the image forming apparatus 100 of this embodiment. The image forming apparatus 100 includes a controller 120. The controller 120 includes a CPU 121 as a calculating means which is a central unit for performing arithmetic processing, a memory (storing element) 122 such as a ROM or a RAM as a storing means, an input/output portion (not shown) for transferring signals between the controller 120 and each of components connected to the controller 120, and the like means. In the RAM, a detection result of the sensor, a calculation result, and the like are stored, and in the ROM (including a rewritable one), a control program, a data table acquired in advance, and the like are stored.

The controller 120 is a control means capable of integrally controlling the operation of the image forming apparatus 100. To the controller 120, respective portions of the image forming apparatus 100 are connected. For example, to the controller 120, the various driving portions such as the drum driving portion 21 and the belt driving portion 22, the various power sources such as the secondary transfer power source 31, the exposure device 3 (not shown), the operating portion 130, and the like are connected. The controller 120 is capable of executing the image formation and the reverse and normal rotation control by controlling the operations (ON/OFF and rotational directions) of the above-described various driving portions, the operations (ON/OFF and rotational directions) of the above-described various power sources, the operation (ON/OFF and exposure amount) of the exposure device 3, and operation timings of these members (portions). Incidentally, to the image forming apparatus 100, an image reading device (apparatus) for reading an image of an original and for supplying read image information to the image forming portions or the like may be provided or connected, and the image forming apparatus 100 may be operable as a copying machine.

Here, the image forming apparatus 100 is capable of executing the job (print job, printing job) which is a series of operations for forming image(s) on a single recording material S or a plurality of recording materials S started by a single start instruction. The start instruction is inputted, to the controller 120, from an external device such as a personal computer connected to the image forming apparatus 100 or from the operating portion 130.

The job includes an image forming step (printing step), a pre-rotation step, a sheet (paper) interval step in the case where the images are formed on the plurality of recording materials S, and the post-rotation step, in general. The image forming step is a period in which formation of an electrostatic latent image, development of the electrostatic latent image (formation of the toner image), primary transfer of the toner image, secondary transfer of the toner image, fixing of the toner image, and the like are actually carried out, and during image formation refers to this period. Specifically, a timing during the image formation is different between positions where the respective steps of the formation of the electrostatic latent image, the toner image formation, the primary transfer of the toner image, the secondary transfer of the toner image, the fixing of the toner image, and the like are performed. The pre-rotation step is a period in which a preparatory operation before the image forming step is performed. The sheet interval step (image interval step) is a period corresponding to an interval between a recording material S and a (subsequent) recording material S when the image forming step on the plurality of recording materials S are continuously performed (during continuous image formation). The post-rotation step is a period in which a post-operation (preparatory operation) after the image forming step is performed. During non-image formation is a period other than during image formation and includes the periods of the pre-rotation step, the sheet interval step, the post-rotation step which are described above and further includes a period of a pre-multi-rotation step which is a preparatory operation during turning-on of a power source of the image forming apparatus 100 or during restoration from a sleep state. In this embodiment, the image forming apparatus 100 is capable of executing the reverse and normal rotation control during the non-image formation.

7. Reverse and Normal Rotation Control

FIG. 5 is a flowchart showing a procedure of a job including the reverse and normal rotation control in this embodiment. In this embodiment, control (calculation discrimination) in accordance with this flowchart is carried out by the controller 120 provided in the image forming apparatus 100.

When the controller 120 acquires job information (including start instruction image information, various pieces of setting information such as the number of sheets, subjected to the image formation, and the like), first, the controller 120 adds the number of sheets of the job to a sheet number storing portion N for storing an integrated number of sheets from at the time of execution of the last reverse and normal rotation control (S101). For example, in the case where the controller 120 executes a continuous image forming job in which the number of sheets is 40 sheets, the controller 120 adds 40 to the sheet number storing portion N. In this embodiment, the sheet number storing portion N is constituted as a storing area provided in the memory 122. The sheet number storing portion N may integrate and store the number of sheets as, for example, a value converted into the number of sheets of predetermined-sizes S. In this embodiment, an initial value of the number of sheets stored in the sheet number storing portion N was 0. Incidentally, in this embodiment, the reverse and normal rotating sequence is executed at least one after the end of the post-rotation step of the job (see S105), and therefore, the integrated number of sheets stored in the sheet number storing portion N equals to the value of the number of sheets in the job. However, in the case where a constitution in which the case where the reverse and normal rotating sequence is not executed even once is employed, the integrated number of sheets stored in the sheet number storing portion N becomes a value obtained by adding the number of sheets in the current job to the number of sheets in the job executed immediately before the current job.

Further, for simplification, the sheet number information itself stored in the sheet number storing portion N is referred to as an image formation sheet number N in some instances. Next, the controller 120 executes a predetermined pre-rotation step (S102), and then executed image formation of a predetermined number of sheets in the job (S103). Thereafter, the controller 120 executes a predetermined post-rotation step (S104).

After the post-rotation step, the controller 120 sets 1 in a number-of-times storing portion REV for storing the number of times of execution of the reverse and normal rotating sequence (S105). Incidentally, the number-of-times storing portion REV is constituted as a storing area provided in the memory 122. Incidentally, for simplification, number-of-times information itself stored in the number-of-sides storing portion REV is referred to as an execution number REV of the reverse and normal rotating sequence in some instances. In this embodiment, the reverse and normal rotating sequence is executed at least once after the end of the post-rotation step, and therefore, in S105, the controller 120 sets 1 in the number-of-times storing portion REV. However, in the case where a constitution in which the reverse and normal rotating sequence is not executed even once is employed, the numerical value set in the number-of-times storing portion REV in S105 may be 0. Then, in order to execute the reverse and normal rotation control, the control 120 sets a reverse and normal rotation control parameter (S106). FIG. 6 is a flowchart showing a procedure of setting of the reverse and normal rotation control parameter executed in S106 of FIG. 5.

The procedure of the setting of the reverse and normal rotation control parameter will be described using FIG. 6. First, the controller 120 set a reverse rotation time defining a provided rotation distance at 100 msec in a reverse rotation time storing portion RT (S201). In this embodiment, the reverse rotation time storing portion RT is constituted as a storing area provided in the memory 122. Incidentally, for simplification, time information itself stored in the reverse rotation time storing portion RT is referred to as a reverse rotation time RT in some instance. Then, the controller 120 sets a normal (forward) rotation time defining a normal (forward) rotation distance at 80 msec in a normal (formed) rotation time storing portion FT (S202). In this embodiment, the normal rotation time storing portion FT is constituted as a storing area provided in the memory 122. Incidentally, for simplification, time information itself stored in the normal rotation time storing portion FT is referred to as a normal (forward) rotation time FT in some instances. Then, the controller 120 discriminates whether or not an integrated number of sheets subjected to the image formation is larger than a predetermined threshold (S203). That is, in this embodiment, the number of times of execution of the reverse and normal rotating sequence is made variable depending on the integrated number of sheets (subjected to the image formation) from the time of execution of the last reverse and normal rotating sequence. Further, herein, discrimination as the whether or not the number of times of execution of the reverse and normal rotating sequence is changed is made. In this embodiment, the threshold of the above-described integrated number of sheets was set at 20 sheets. Incidentally, this threshold may be an arbitrary value. For example, in the case where the continuous image forming job in which the number of sheets (subjected to the image formation) is 40 sheets as described above, the integrated number of sheets stored in the sheet number storing portion N is 40 sheets, and therefore, the controller 120 discriminates in S203 as "YES". Incidentally, for example, when the above-described integrated number of sheets is 0 sheets, irrespective of the integrated number of sheets, the reverse and normal rotating sequence is executed a plurality of times. In the case where the controller 120 discriminated in S203 as "YES", the controller 120 sets the number of times of execution of the reverse and normal rotating sequence again (S204). In this embodiment, in the case where the integrated number of sheets is larger than 20 sheets, the controller 120 sets the number-of-times storing portion REV at 3 in S204 so as to execute the reverse and normal rotating sequence at least three times. On the other hand, in the case where the controller 120 discriminated in S203 as "NO", the controller 120 ends the setting of the reverse and normal rotation control parameter (S209).

After S204, the controller 120 causes a print ratio storing portion D for storing an average print ratio from the time of execution of the last reverse and normal rotation-control to store an average print ration, currently calculated, from the time of execution of the last reverse and normal rotation control (S205). In this embodiment, the print ratio storing portion D is constituted as a storing area provided in the memory 122. Incidentally, for simplification, print ratio information itself stored in the print ratio storing portion D is referred to as an average print ratio D. That is, in S205, the controller 120 reads the print ratio stored in the print ratio storing portion D and then calculates again the average print ratio from the time of execution of the last reverse and normal rotation control on the basis of a print ratio of each of images in the job currently executed. The print ratio is roughly expressed by a ratio (%) of an image portion when the case where entirety of the image forming region (toner image formable region) is an image with a maximum density level (while surface solid image) is taken as 100%. In this embodiment, an initial value of the average print ratio stored in the print ratio storing portion D was 0. For example, in the case where the average print ratio is 5%, the controller 120 sets 5% in the print ratio storing portion D.

Then, the controller 120 discriminates whether or not the average print ratio stored in the print ratio storing portion D is larger than a predetermined threshold (S206). That is, in this embodiment, the number of times of execution of the reverse and normal rotating sequence is made variable depending on the average print ratio from the time of execution of the last reverse and normal rotation control. Further, in this embodiment, discrimination as to whether or not the number of times of execution of the reverse and normal rotating sequence is changed is made. In this embodiment, the threshold of the above-described average print ratio was 20%. Incidentally, this threshold may be an arbitrary value. For example, in the case where the average print ratio is 5%, the controller 120 discriminates in S206 as "NO". Further, in the case where the average print ratio is larger than 20%, the controller 120 discriminates in S206 as "YES". In the case where the controller 120 discriminated in S206 as "YES", the controller 120 adds 3 to the number of times of execution of the reverse and normal rotating sequence stored in the number-of-times storing portion REV (S207). On the other hand, in the case where the controller 120 discriminated in S206 as "NO", the controller 120 causes the process to go to S208 without adding 3 to the number of times of execution of the reverse and normal rotating sequence.

After S206 and S207, the controller 120 resets the normal rotation time, set in S202, to 180 msec (S208). This is because depending on that the controller 120 discriminated in S203 that the reverse and normal rotating sequence is executed the plurality of times, the normal rotation time (normal rotation distance) is made longer than the reverse rotation time (reverse rotation distance). That is, by doing so, the pass-through toner Ta discharged to the intermediary transfer belt 7 by the reverse rotating operation is prevented from being returned to the cleaning nip Q again. Thereafter, the controller 120 ends the setting of the reverse and normal rotation control parameter (S209).

Then, the controller 120 return the procedure to the procedure of FIG. 5, and executes the reverse and normal rotation control (S107). FIG. 7 is a flowchart showing a procedure of the reverse and normal rotation control executed in S107 of FIG. 5.

The procedure of the reverse and normal rotation control will be described using FIG. 7. First, the controller 120 discriminates whether or not the value of the number of times of execution of the reverse and normal rotating sequence stored in the number-of-times storing portion REV is larger than 0, and thus discriminates execution or non-execution of the reverse and normal rotating sequence (S301). Incidentally, in this embodiment, after the end of the post-rotation step of the job, the reverse and normal rotating sequence is executed at least once (see S105), and therefore, the controller 120 discriminates as "YES" in S301. Then, the controller 120 executes the reverse rotating operation (S302).

In this embodiment, the reverse rotating operation is executed for a time (distance) stored in the reverse rotation time storing portion RT. In this embodiment, the reverse rotation time is 100 msec. Then, the controller 120 executes the normal rotating operation (S303). Here, the normal rotating operation is executed for a time (distance) stored in the normal rotation time storing portion FT. In this embodiment, the normal rotation time in the normal rotating operation excluding the final normal rotating operation in the case where the reverse and normal rotating sequence is executed the plurality of times (or excluding the normal rotating operation in the case where the reverse and normal rotating sequence is executed once) is 180 msec. Thus, in this embodiment, in repetition of the reverse and normal rotating sequence, during execution of the reverse and normal rotating sequence other than the final reverse and normal rotating sequence, a relationship of (reverse rotation time RT)<(normal rotation time FT) holds. For that reason, returning of the pass-through toner Ta once discharged to the intermediary transfer belt 7 to the during nip Q is prevented.

The normal rotation time in the final normal rotating operation in the case where the reverse and normal rotating sequence is executed the plurality of times (or the normal rotating operation in the case where the reverse and normal rotating sequence is executed once) will be described later.

Then, the controller 120 subtracts 1 from the number of times of execution of the reverse and normal rotating sequence stored in the number-of-times storing portion REV (S304). Then, the controller 120 discriminates whether or not the value of the number of times of execution of the reverse and normal rotating sequence stored in the number-of-times storing portion REV is larger than 1, and thus discriminates whether or not the value of the number of times of the execution of the reverse and normal rotating sequence stored in the number-of-times storing portion REV is 0 (S305). In the case where the controller 120 discriminated as "YES" in S305, the controller 120 discriminates whether or not the value of the number of times of execution of the reverse and normal rotating sequence stored in the number-of-times storing portion REV is 1, and thus discriminates whether or not the repetition of the reverse and normal rotating sequence is final in subsequent execution (S306). In the case where the controller 120 discriminated as "YES" in S306, the controller 120 sets 100 msec in the reverse rotation time storing portion RT (S307), and sets 80 msec in the normal rotation time storing portion FT (S308).

Thus, in this embodiment, in the repetition of the reverse and normal rotating sequence, during execution of the final reverse and normal rotating sequence, a relationship of (reverse rotation time RT)<(normal rotation time FT) holds. This is also true for the case where the reverse and normal rotating sequence is executed once. By making such a setting, it is possible to prevent a stop of rotation of the intermediary transfer belt 7 in a state in which the foreign matter, such as the paper powder or the wax component nipped in the cleaning nip Q, removed from the cleaning nip Q by the reverse rotating operation is returned to the cleaning nip Q. That is, the foreign matter such as the paper powder or the wax component removed from the cleaning nip Q is returned to the cleaning nip Q, and when the rotation of the intermediary transfer belt 7 is stopped in a state in which the returned foreign matter is blocked by the cleaning blade 82, a deposit trace of the foreign matter remains on the surface of the intermediary transfer belt 7 in some instances. There is a possibility that this deposition trace has the influence such that image non-uniformity is generated in subsequent image formation. For that reason, as described above, in the final normal rotating operation in the case where the reverse and normal rotating sequence is executed the plurality of times (or in the normal rotating operation in the case where the reverse and normal rotating sequence is executed once), it is preferable that the intermediary transfer belt 7 is moved in a movement amount (normal rotation distance) smaller than a movement amount (reverse rotation distance) of the intermediary transfer belt 7 in the last reverse rotating operation.

Then, in the case where the controller 120 discriminated as "No" in S305, the value of the number of times of execution of the reverse and normal rotating sequence stored in the number-of-times storing portion REV is 0, and therefore, the controller 120 resets the value of the sheet number storing portion N to 0 (S309), and then resets the value of the print ratio storing portion D to 0 (S310), and then ends the reverse and normal rotation control (repetition of the reverse and normal rotating sequence).

Incidentally, each of the pre-rotation step and the post-rotation step is a control sequence including rising (or falling) of drive of the photosensitive drum 1, the developing device 4, and the intermediary transfer belt 7 and rising (or falling) of high-voltage application to the charging roller 2, the developing roller 41, the primary transfer roller 5, and the secondary transfer roller 9. In this embodiment, a specific control sequence of each of the pre-rotation step and the post-rotation step is an arbitrary one, and can appropriately employ a well-known one, for example.

The movement of the pass-through toner Ta (discharged toner Tb) in the reverse and normal rotation control in accordance with this embodiment will be further described using FIG. 9. Parts (a) to (d) of FIG. 9 are schematic views (sectional views substantially perpendicular to the rotational axis direction of the supporting roller for the intermediary transfer belt 7) for illustrating a state in which the discharged toner Tb which is the pass-through toner Ta discharged to the intermediary transfer belt 7 in the reverse and normal rotation control.

FIG. 9 shows an example in the case where the reverse and normal rotating sequence is executed three times. Herein, a portion where the discharged toner Tb is deposited on the intermediary transfer belt 7 is also simply referred to as a "discharge portion Tb". This discharge portion Tb is specifically a portion on the intermediary transfer belt 7 where the cleaning nip Q exists after execution of one reverse rotating operation and before execution of the subsequent normal rotating operation in the reverse and normal rotation control.

Part (a) of FIG. 9 shows a state of a point of time when a first reverse rotating operation and a first normal rotating operation subsequent to the first reverse rotating operation are ended. The pass-through toner Ta deposited on the back surface of the cleaning blade 82 is pressed against and deposited on the intermediary transfer belt 7 by the first reverse rotating operation (broken arrow). Thereafter, this pass-through toner Ta is discharged and fed to the intermediary transfer belt 7 by the first normal rotating operation (solid arrow). In this case, a first reverse rotation distance is 32 mm, and first normal rotation distance is 50 mm. Part (b) of FIG. 9 shows a state at a point of time when a second reverse rotating operation is ended. In this case, a second reverse rotation distance is 32 mm. A relationship of (second reverse rotation distance)<(first normal rotation distance) holds, and therefore, the discharge portion Tb (Tb1) by the first reverse rotating operation is not returned to the cleaning nip Q by the second reverse rotating operation. Part (c) of FIG. 9 shows a state at a point of time when a second normal rotating operation is ended. In this case, a second normal rotation distance is 112 mm. The pass-through toner Ta which cannot be completely discharged by the first reverse rotating operation is discharged on and conveyed by the intermediary transfer belt 7. On the intermediary transfer belt 7, the discharge portion Tb (Tb1) by the first reverse rotating operation exists on a downstream side with respect to the normal rotational direction of the intermediary transfer belt 7, and a discharge portion Tb (Tb2) by the second reverse rotating operation exists on an upstream side with respect to the normal rotational direction of the intermediary transfer belt 7. Part (d) of FIG. 9 shows a state at a point of time when a third reverse rotating operation and a third normal rotating operation subsequent to the third reverse rotating operation are ended. In this case, a third reverse rotation distance is 32 mm, and a normal rotation distance is 24 mm. In an example of part (d) of FIG. 9, the pass-through toner Ta is almost completely discharged by the two reverse and normal rotating sequences, and therefore, the pass-through toner T1 is little discharged by the third reverse and normal rotating sequence. Further, a relationship of (second reverse distance)>(third normal rotation distance) holds, and therefore, the rotation of the intermediary transfer belt 7 is not stopped in a state in which the foreign matter such as the paper powder removed from the cleaning nip Q until the third reverse rotating operation is returned to the cleaning nip Q. Incidentally, in the example of FIG. 9, the reason why the second normal rotation distance is made longer than the first normal rotation distance is that positions of the discharge portions Tb (Tb1, Tb2) at the time of the end of the third normal rotating operation are positions described later in an embodiment 3.

In other words, in the case where the reverse and normal rotating sequence is executed n times (n may be an integer of 0 or more, but is an integer of 2 or more in this case), when the reverse rotating operation is executed k times (k is 0 to (n−1) time(s)), a k-th normal rotation distance is made larger than a (k+1)-th reverse rotation distance. Further, in this embodiment, in this case, an n-th normal rotation distance is made smaller than an (n−1)-th reverse rotation distance.

Further, in other words, the controller 120 carries out control so that the discharge portion Tb1 by the first reverse rotating operation is not returned to the cleaning nip Q from the end of the first normal rotating operation to the end of the final normal rotating operation.

Further, in other words, in the case where the reverse and normal rotating sequence is executed the plurality of times in the reverse and normal rotation control, a sum of movement amounts of the intermediary transfer belt 7 by the normal rotating operations performed after the first reverse rotating operation is a first movement amount. Further, a sum of movement amounts of the intermediary transfer belt 7 by the reverse rotating operations performed after the first reverse rotating operation is a second movement amount. The controller 120 carries out control so that the second movement amount is larger than the first movement amount. For this reason, it becomes possible to carry out control so that the discharge portion Tb is not returned to the cleaning nip Q.

Thus, in this embodiment, the image forming apparatus 100 includes the rotatable image bearing member 7 for bearing the toner image on the surface thereof, the transfer means 9 for transferring the toner image from the image bearing member rotating in the normal rotational direction onto the toner image receiving member S in the transfer portion T2, the cleaning blade 82 which forms the contact portion Q in contact with the surface of the image bearing member 7 and which removes the toner from the surface of the image bearing member 7 rotating in the normal rotational direction, the driving portion 22 capable of rotating the image bearing member 7 in the normal rotational direction and the rotation rotational direction which is the opposite direction to the normal rotational direction, and the controller 120 capable of controlling the driving portion 22 so as to perform the normal rotating operation which is the rotating operation of the intermediary transfer belt 7 in the normal rotational direction and the reverse rotating operation which is the rotating operation of the image bearing member 7 in the reverse rotational direction. The controller 120 is capable of controlling the image bearing member 7 so that when the job in which the toner image is transferred from the image bearing member 7 onto the toner image receiving member S is ended, rotation of the image bearing member 7 is stopped after the reverse and normal rotating sequence in which the normal rotating operation is performed after the reverse rotating operation is performed is continuously executed the plurality of times. In the case where the reverse and normal rotating sequence is continuously executed the plurality of times, the controller 120 carries out control so that the movement amount of the image bearing member 7 by the normal rotating operation subsequent to the reverse rotating operation is larger than the movement amount of the image bearing member by the substantially reverse rotating operation. In this embodiment, in the case where the reverse and normal rotating sequence is continuously executed the plurality of times, the controller 120 carries out control so that the movement amount of the image bearing member 7 by the final normal rotating operation is smaller than the movement amount of the image bearing member 7 by the preceding reverse rotating operation. Further, in this embodiment, the controller 120 is capable of changing the number of times of execution of the reverse and normal rotating sequence at the time of the end of the current job on the basis of the integrated number of sheets (subjected to the image formation) after the execution of the last reverse and normal rotating sequence. Further, the controller 120 is capable of changing the number of times of execution of the reverse and normal rotating sequence at the time of the end of the current job on the basis of the average print ratio after the execution of the last reverse and normal rotating sequence.

As described above, according to this embodiment, even in the case where the job in which the high-print ratio image is formed and the job in which the number of sheets is large are executed, the pass-through toner Ta deposited on the back surface of the cleaning blade 82 can be effectively discharged. Further, according to this embodiment, the pass-through toner Ta once discharged is prevented from being deposited again on the back surface of the cleaning blade 82. Accordingly, even in the case where the job in which the high-print ratio image is formed and the job in which the number of sheets is large are executed, the pass-through toner Ta deposited on the back surface of the cleaning blade 82 is effectively removed, so that generation of the lateral stripe image can be suppressed.

Embodiment 2

Next, another embodiment of the present invention will be described. Basic constitutions and operations of an image forming apparatus in this embodiment are the same as those of the image forming apparatus in the embodiment 1. Accordingly, in the image forming apparatus in this embodiment, elements having the same or corresponding functions and constitutions as those in the image forming apparatus in the embodiment 1 are represented by the same reference numerals or symbols as those in the embodiment 1 and will be omitted from detailed description.

1. Outline of this Embodiment

In this embodiment, the image forming apparatus 100 is capable of executing the reverse and normal rotation control by interrupt control in a sheet interval step of a job. That is, in the case where a recording material S relatively large in generation amount of the foreign matter such as the paper powder or the like recording material is used, during execution of a job large in number of sheets subjected to the image formation, a degree of nipping of the foreign matter such as the paper powder in the cleaning nip Q becomes conspicuous in some cases. By this, the toner passes through the cleaning blade 82, so that improper cleaning occurs in some cases.

A Table 2 below shows a result such that in the case where an experiment similar to the experiment from which the result of the table 1 in the embodiment 1 was obtained, presence ("x") or absence ("○") of the foreign matter such as the paper powder nipped in the cleaning nip Q (occurrence ("x") or non-occurrence ("○") of passing of the toner through the cleaning blade 82) is checked after an end of the experiment in three stages by using the recording material S relatively large in generation amount of the foreign matter such as the paper powder.

TABLE 2

| | NOCPS*[2] (A4: ONE SIDE) | | | | | |
|---|---|---|---|---|---|---|
| RNRS*[1] | 10 | 20 | 50 | 100 | 150 | 200 |
| one time | ○ | ○ | x | x | x | x |
| three times | ○ | ○ | ○ | ○ | x | x |
| five times | ○ | ○ | ○ | ○ | x | x |

*[1]"RNRS" is the reverse and normal rotating sequence.
*[2]"NOCPS" is the number of continuously passed sheets.

In the case where the number of sheets is large, it is understood that even when the reverse and normal rotating sequence is executed fine times after the end of the post-rotation step, the foreign matter such as the paper powder nipped in the cleaning nip Q cannot be sufficiently removed in some cases.

Therefore, in this embodiment, on the basis of the number of sheets subjected to image formation in the job, the reverse and normal rotation control is made executable by the interrupt control. Further, in the case where the reverse and normal rotation control is executed in the sheet interval step of the job, the number of times of execution of the reverse and normal rotating sequence in the reverse and normal rotation control executed after the end of the post-rotation step of the job is made changeable in a decreasing direction.

2. Control in this Embodiment

FIG. 8 is a flowchart showing a procedure of a job including the reverse and normal rotation control in this embodiment. In this embodiment, control (calculation discrimination) in accordance with this flowchart is carried out by the controller 120 provided in the image forming apparatus 100. Incidentally, the reverse and normal rotation control itself is similar to the reverse and normal rotation control described in the embodiment 1, and therefore will be omitted appropriately from detailed description.

When the controller 120 acquires job information, first, the controller 120 acquires information of the number of sheets of the job and causes the sheet number storing portion N to store the information (S401). In this embodiment, in the sheet number storing portion N, the number of sheets of the job is stored. For example, in the case where the controller 120 executes a continuous image forming job in which the number of sheets is 40 sheets, the controller 120 causes the sheet number storing portion N to store 40 sheets. Then, the controller 120 executes a predetermined post-rotation step (S402). Then, the controller 120 discriminates whether or not the number of sheets of the job is 21 sheets or more (S403). For example, in the case where the number of sheets of the job is 40 sheets, the controller 120 discriminates as "YES" in S403. In the case where the controller 120 discriminated as "NO" in S403, the image formation on the predetermined number of sheets of the job is executed, and the reverse and normal rotating sequence is executed once after the end of the post-rotation step of the job, and then the job is ended (S404).

In the case where the controller 120 discriminated as "YES" in S403, the controller 120 discriminated whether or not a cleaning stability-enhanced mode is set (S405). Herein, the cleaning stability-enhanced mode is mode in which even in the case where the recording material S relatively large in generation amount of the foreign matter such as the paper powder is used, improper cleaning due to the passing of the toner through the cleaning blade 82 can be suppressed. Specifically, in this embodiment, in the case where the cleaning stability-enhanced mode is set, it becomes possible to execute the reverse and normal rotating sequence by the interrupt control in the sheet interval step depending on the number of sheets of the job. The cleaning stability-enhanced mode can be set by an operator such as a user or a service person through a UI display screen of the operating portion 130 (FIG. 4) provided on the image forming apparatus 100 or through an external device such as a personal computer connected to the image forming apparatus 100. When the cleaning stability-enhanced mode is set, the controller 120 causes the memory 122 to store information indicating that the cleaning stability-enhanced mode is set. In the case where the controller 120 discharged as "NO" in S405, the controller 120 executes image formation on the predetermined number of sheets of the job, and executes the reverse and normal rotating sequence three times after the end of the post-rotation step of the job, and then ends the job (S407).

In the case where the controller 120 discriminated as "YES" in S405, the controller 120 discriminates whether or not the number of sheets of the job is 101 sheets or more (S406). For example, in the case where the number of sheets of the job is 75 sheets, the controller 120 discriminates as "NO" in S406. In the case where the controller 120 discriminated as "NO" in S406, the image formation on the predetermined number of sheets of the job is executed, and the reverse and normal rotating sequence is executed three times after the end of the post-rotation step of the job, and then the job is ended (S407).

In the case where the controller 120 discriminated as "YES" in S406, the controller 120 executes the reverse and normal rotation control by the interrupt control in the sheet interval step (between a 100-th sheet and a 101-th sheet) after the image formation on 100 sheets (S408). In this embodiment, specifically, at this time, the sequence enters an operation similar to the operation in the post-rotation step, and after the end of this operation, the controller 120 executes the reverse and normal rotating sequence three times. Thereafter, the controller 120 acquires a remaining number of sheets N(=N−100) of the job and causes the sheet number storing portion N to updates and stores the acquired number of sheets (re-writing) (S409). Then, the controller 120 returns the sequence to S102 and executes the operation similar to the operation in the post-rotation step again. For example, in the case where the number of sheets of the job is 110 sheets and the cleaning stability-enhanced mode is set, the controller 120 executes the reverse and normal rotation control in S408, so that the remaining number of sheets of the job updated in S409 is 10 sheets. In this case, the controller 120 discriminates as "NO" in subsequent S403. Accordingly, in this case, the controller 120 continues the image formation on the remaining number of sheets and executes the reverse and normal rotating sequence only once after the end of the post-rotation step of the job, and then ends the job (S404).

In this embodiment, when the reverse and normal rotation control is carried out by the interrupt control in the sheet interval step, the reverse and normal rotating sequence is executed three times. In this case, not only the foreign matter such as the paper powder nipped in the cleaning nip Q is removed, but also the pass-through toner Ta deposited on the back surface of the cleaning blade 82 is effectively discharged. Accordingly, in the case where a subsequent remaining number of sheets is sufficiently small, control is carried out so that the reverse and normal rotating sequence is not excessively executed after the end of the post-rotation step of the job. By this, it is possible to suppress excessive elongation of a time until the rotation of the intermediary transfer belt 7 is stopped after the image formation.

Thus, in this embodiment, the controller 120 is capable of carrying out control so as to continuously execute the reverse and normal rotating sequence the plurality of times in a period (sheet interval) between transfer of the toner image and transfer of a subsequent toner image in the job in which the plurality of toner images are transferred from the image bearing member 7 onto the toner image receiving members S. Further, in this embodiment, on the basis of whether or not the controller 120 executes the reverse and normal rotating sequence in the above-described period (sheet interval) of the job, the controller 120 is capable of changing the number of times of execution of the reverse and normal rotating sequence at the time of the end of the job.

As described above, according to this embodiment, not only the foreign matter such as the paper powder nipped in the cleaning nip Q can be removed in the sheet interval during execution of the job, but also the pass-through toner Ta deposited on the back surface of the cleaning blade 82 can be effectively discharged while suppressing an increase in down time (a period in which the image cannot be formed).

Embodiment 3

Next, another embodiment of the present invention will be described. Basic constitutions and operations of an image forming apparatus in this embodiment are the same as those of the image forming apparatus in the embodiment 1. Accordingly, in the image forming apparatus in this embodiment, elements having the same or corresponding functions and constitutions as those in the image forming apparatus in the embodiment 1 are represented by the same reference numerals or symbols as those in the embodiment 1 and will be omitted from detailed description.

1. Outline of this Embodiment

In the mechanism described in the embodiment 1, the discharged toner Tb which is the pass-through toner Ta discharged from the back surface of the cleaning blade 82 to the intermediary transfer belt 7 is conveyed while being carried by the intermediary transfer belt 7. Depending on a position of the discharge portion Ta (portion where the discharged toner Tb is deposited on the intermediary transfer belt 7) on the intermediary transfer belt 7 with respect to a rotational direction (circumferential direction) of the intermediary transfer belt 7 when the rotation of the intermediary transfer belt 7 is stopped at the time of the end of the job, there is a case that in a subsequent post-rotation step or the like, the discharged toner Tb is conveyed to the secondary transfer portion T2 and transferred and fixed on the recording material S, and thus the lateral stripe image generates. This phenomenon can be avoided by idling the intermediary transfer belt 7 for a sufficient time (distance) in the above-described subsequent post-rotation step. However, in order to shorten a first copy time (FCOT) to the extent possible, it is desired that a time (distance) in which the intermediary transfer belt 7 is rotated is shortened as can as possible before a first recording material S in the above-described subsequent job reaches the secondary transfer portion T2. Further, it would be considered that a cleaning member for cleaning the discharged toner Tb is added, but there is a possibility that the addition leads to complication and upsizing of an apparatus structure.

2. Control in this Embodiment

In this embodiment, before the recording material S reaches the secondary transfer portion T2 during subsequent image formation, the intermediary transfer belt 7 is rotated so that the discharged portion on the intermediary transfer belt 7 passes through the secondary transfer portion T2 and reaches a position moved from the secondary transfer portion T2 by a distance corresponding to one full circumference or more of the secondary transfer roller 9 and then the rotation of the intermediary transfer belt 7 is stopped. It is possible to suppress the generation of the lateral stripe image due to the transfer of the discharged toner Tb onto the recording material S by passing the discharge portion Tb through the secondary transfer portion T2 before the recording material S reaches the secondary transfer portion T2. Further, before the recording material S reaches the secondary transfer portion T2, the discharge portion Tb is moved from the secondary transfer portion T2 by the distance corresponding to one full circumference or more of the secondary transfer roller 9, so that even when the discharged toner Tb is transferred onto the secondary transfer roller 9, it becomes possible to return the toner to the intermediary transfer belt 7 before the recording material S reaches the secondary transfer portion T2. By this, it is possible to suppress generation of toner contamination (lateral stripe image) on a non-image surface of the recording material S.

In the case where the reverse and normal rotating sequence is executed the plurality of times in the reverse and normal rotation control, the discharged portion Tb by at least first reverse rotating operation may only be required to be moved to the above-described position before the recording material S reaches the secondary transfer portion T2. This is because in the reverse and normal rotation control at one execution timing, the pass-through toner Ta in a largest amount is deposited on the discharge portion Tb by the first reverse rotating operation. However, it is preferable that the discharge portion Tb by a plurality of reverse rotating operations including the discharge portion Tb by at least first reverse rotating operation is moved to the position as described above before the recording material S reaches the secondary transfer portion T2 during subsequent image formation. As described in the embodiment 1, the pass-through toner Ta discharged by the final reverse rotating operation is sufficiently small in some instances. In such a case, it is preferable that portions from the discharge portion Tb by the first reverse rotating operation to the discharge portion Tb by a reverse rotating operation preceding the final reverse rotating operation are moved to the above-described position before the recording material S reaches the secondary transfer portion T2 during subsequent image formation. Typically, the discharge portions Tb by all the reverse rotating operations can be moved to the above-described position before the recording material S reaches the secondary transfer portion T2 during subsequent image formation.

Incidentally, the position where the discharge portion Tb (the discharge portion Tb by at least first reverse rotating operation) reaches before the recording material S reaches the secondary transfer portion T2 during subsequent image formation may preferably be position until the discharge portion Tb first reaches the cleaning nip Q after passes through the secondary transfer portion T2. The discharged toner Tb is then removed from the intermediary transfer belt 7 by the belt cleaning device 8. Further, although the position is not limited thereto, typically, the above-described position where the discharge portion Tb reaches is a position moved from the secondary transfer portion T2 by a distance corresponding to 5 full circumferences or less, preferably 3 full circumferences, of the secondary transfer roller 9. By this, the time (distance) in which the intermediary transfer belt 7 is rotated can be shortened to the extent possible before the recording material S reaches the secondary transfer portion T2 during subsequent image formation.

Further, movement of the discharge portion Tb (the discharge portion Tb by at least first reverse rotating operation) to the above-described position may be made before the rotation of the intermediary transfer belt 7 is stopped at the time of the end of the job in which the reverse and normal rotation control is executed or made in the pre-rotation step in a subsequent job. That is, the discharge portion Tb may pass through the secondary transfer portion T2 before the rotation of the intermediary transfer belt 7 is stooped at the time of the end of the job in which the reverse and normal rotation control is executed or may pass through the secondary transfer portion T2 in the pre-rotation step before a first recording material S of a subsequent job reaches the secondary transfer portion T2.

Using FIG. 10, the above-described movement of the discharge portion Tb in this embodiment will be further described. FIG. 10 is a schematic view (sectional view substantially perpendicular to the rotational axis direction of the supporting roller for the intermediary transfer belt 7) for illustrating a state of the movement of the discharged toner Tb. In this embodiment, for simplification, the case where the reverse and normal rotating sequence is executed once is described as an example.

First, the pass-through toner Ta deposited on the back surface of the cleaning blade 82 is pressed against and deposited on the intermediary transfer belt 7 during the reverse rotating operation (broken arrow after the end of the image formation). Thereafter, this pass-through toner Ta is discharged on and conveyed by the intermediary transfer belt 7 with normal rotation of the intermediary transfer belt 7 during the normal rotating operation (solid arrow). Then, as described above, the intermediary transfer belt 7 is rotated so that before the recording material S reaches the secondary transfer portion T2 during subsequent image formation, the discharge portion Tb of the intermediary transfer belt 7 passes through the secondary transfer portion T2 and reaches a position moved from the secondary transfer portion T2 by a distance corresponding to one full circumference or more of the secondary transfer roller 9.

In the example shown in FIG. 10, the reverse rotation distance is 32 mm, and the normal rotation distance is 24 mm. Further, a distance from the cleaning nip Q to the secondary transfer portion T2 is 396.5 mm. Further, the discharge portion Tb is positioned in a position of 24 mm from the cleaning nip Q on a downstream side with respect to the normal rotational direction at the time of the end of the reverse and normal rotation operation (final normal rotating operation). Further, an upper limit of a tolerance of the distance (peripheral length) corresponding to one full circumference of the secondary transfer roller 9 is 62.8 mm. In this case, before the recording material S reaches the secondary transfer portion T2, the discharge portion Tb may only be required to be moved by a distance obtained by adding a distance corresponding to the upper limit (=62.8 mm) of the tolerance of the peripheral length of the secondary transfer roller 9 to a distance (=396.5 mm−24 mm=372.5 mm) to the secondary transfer portion T2 from the position of 24 mm from the cleaning nip Q on the downstream side with respect to the normal rotational direction.

Incidentally, as described above, in the case where the reverse and normal rotating sequence is executed the plurality of times in the reverse and normal rotation control, the rotation of the intermediary transfer belt 7 may only be required to be stopped after being rotated so that the discharge portion Tb by at least the first reverse rotating operation is moved by the above-described distance before the recording material S reaches the secondary transfer portion T2 during the subsequent image formation. For example, in the case of the example described using FIG. 9, the positions of the discharge portions Tb (Tb1, Tb2) by the first reverse rotating operation and the second reverse rotating operation, respectively at the time of the end of the final normal rotating operation (third normal rotating operation) may only be required to be set so that the discharge portions Tb by the first and second reverse rotating operations are moved to the above-described positions before the recording material S reaches the secondary transfer portion T2 during the subsequent image formation. Typically, the discharge portions Tb (Tb1, Tb2) by the first and second reverse rotating operations pass through the secondary transfer portion T2 in the pre-rotation step of the subsequent job. For example, as in the example of FIG. 9, in order to shorten the third normal rotation distance, by making the second normal rotation distance long, it is possible to adjust the positions of the discharge portions Tb (Tb1, Tb2) at the time of the end of the third normal rotating operation.

Further, when the discharge portion Tb (the discharge portion Tb by at least the first reverse rotating operation) passes through the secondary transfer portion T2, it is preferable that in the secondary transfer portion T2, an electric field (electric field in a direction opposite to the direction during the secondary transfer) for urging the toner, charged to the normal charge polarity, from the secondary transfer roller 9 side toward the intermediary transfer belt 7 side. In the constitution of this embodiment, specifically, a voltage of the same polarity (which is the opposite polarity to the polarity during the secondary transfer) as the normal charge polarity of the toner is applied to the secondary transfer roller 9 when the discharge portion Tb passes through the secondary transfer portion T2. By this, it is possible to suppress that the discharged toner Tb is transferred to the secondary transfer roller 9. The voltage is started to be applied before the discharge portion Tb reaches the secondary transfer portion T2, and this application of the voltage may be continued until the discharge portion Tb completely pass through the secondary transfer portion T2. However, a constitution in which the voltage is not applied to the secondary transfer portion T2 when the discharge portion Tb passes through the secondary transfer portion T2 may also be employed. Also, in this case, the secondary transfer roller 9 is rotated at least one full circumference after the discharge portion Tb passes through the secondary transfer portion T2 and before the recording material S reaches the secondary transfer portion T2, so that the discharged toner Tb (little charged in many instances) transferred onto the secondary transfer roller 9 is returned to the intermediary transfer belt 7 and thus is reduced in amount.

Further, cleaning of the secondary transfer roller 9 may be carried out after the discharge portion Tb (the discharge portion Tb by at least the first reverse rotating operation) passes through the secondary transfer portion T2 and before the recording material S reaches the secondary transfer portion T2. The cleaning of the secondary transfer roller 9 can be carried out by forming an electric field (in the distance opposite to the direction during the secondary transfer) for urging the toner, charged to the normal charge polarity of the toner, from the secondary transfer roller 9 side to the intermediary transfer belt 7 side in the secondary transfer portion T2, or by forming the electric field (in the direction opposite to the direction during the secondary transfer) for urging the toner, charged to the normal charge polarity of the toner, from the secondary transfer roller 9 side to the intermediary transfer belt 7 side and an electric field (in the distance identical to the direction during the secondary transfer) for urging the toner, charged to the polarity opposite to the normal charge polarity of the toner, from the secondary transfer roller 9 side to the intermediary transfer belt 7 side, in the secondary transfer portion T2. In the constitution of this embodiment, specifically, the cleaning of the secondary transfer roller 9 can be carried out by applying the voltage of the same polarity which is the opposite polarity to the polarity during the secondary transfer) as the normal charge polarity of the toner to the secondary transfer roller 9 or by applying, to the secondary transfer roller 9, the voltage of the same polarity (which is the opposite polarity to the polarity during the secondary transfer) as the normal charge polarity of the toner and the voltage of the opposite polarity (which is the same polarity as the polarity during the secondary transfer) to the normal charge polarity of the toner. These voltages of the respective polarities may also be alternately applied over a plurality of times. Although the present invention is not limited thereto, the voltages of the respective polarities may preferably be applied from a period corresponding to one full circumference or more (typically 3 full circumferences or more) of the secondary transfer roller 9. By this, the toner charged to the opposite polarity to the polarity of the applied voltage can be returned effectively from the secondary transfer roller 9 to the intermediary transfer belt 7. For example, in the case where the voltage of the same polarity (which is the opposite polarity to the polarity during the secondary transfer) as the normal charge polarity of the toner is applied to the secondary transfer roller 9 when the discharge portion Tb passes through the secondary transfer portion T2 as described above, application of this voltage is continued for a time corresponding to one full circumference of the secondary transfer roller 9 after the discharge portion Tb passes through the secondary transfer portion T2, and then the voltage of the opposite polarity (which is the same polarity as the polarity during the secondary transfer) to the normal charge polarity of the toner is applied for the time corresponding to one full circumference of the secondary transfer roller 9. The cleaning of the secondary transfer roller 9 can be carried out at least one of after the end of the post-rotation step of the job (after the end of the reverse and normal rotation control) and before the rotation of the intermediary transfer belt 7 is stopped, and in the pre-rotation step of the job.

Incidentally, in a constitution in which the secondary transfer voltage of the same polarity as the normal charge polarity of the toner is applied to the inner roller corresponding to the driving roller 71 in this embodiment and in which the outer roller corresponding to the secondary transfer roller 9 is electrically grounded, the following operation may only be required to be performed. That is, when the above-described discharge portion to passes through the secondary transfer portion T2 or when the cleaning of the secondary transfer roller 9 is carried out, the voltage of the opposite polarity to the voltage applied to the secondary transfer roller 9 may only be applied.

An example of the voltages applied to the secondary transfer roller 9 before and after the discharge portion Tb passes through the secondary transfer portion T2 will be described using FIG. 11. FIG. 11 is a timing chart showing an outline of progression of the voltages applied to the secondary transfer roller 9 before and after the discharge portion Tb passes through the secondary transfer portion T2. In this embodiment, as described above using FIG. 9, the case where the reverse and normal rotating sequence is executed three times in the reverse and normal rotation control is taken as an example. Further, in this embodiment, the discharge portions Tb (Tb1, Tb2) by the first and second reverse rotating operations are moved to the above-described positions before the recording material S reaches the secondary transfer portion T2 during the subsequent image formation. Further, the discharge portions Tb (Tb1, Tb2) by the first and second reverse rotating operations pass through the secondary transfer portion T2 in the pre-rotation step of the subsequent job.

First, during the secondary transfer, the voltage of the positive polarity is applied to the secondary transfer roller 9. When the secondary transfer is ended, the post-rotation step is executed (t1 to t2). Then, the reverse and normal rotation control is carried out and the rotation of the intermediary transfer belt 7 is stopped (t2 to t3). For example, during the post-rotation step, when the reverse and normal rotation control is carried out, the application of the voltage to the secondary transfer roller 9 is stopped. Thereafter, when the subsequent toner is started, the pre-rotation step is started (t4). At this time, the application of the voltages of the negative polarity (which is the opposite polarity during the secondary transfer) to the secondary transfer roller 9 is started. Thereafter, at t5 and t6, the discharge portions Tb1 and Tb2 by the first and second reverse rotating operations in the reverse and normal rotation control at the time of the end of the last job pass through the secondary transfer portion T2, respectively. Thereafter, the application of the voltage of the negative polarity to the secondary transfer roller 9 is continued until a time corresponding to one full circumference of the secondary transfer roller 9 has elapsed from a time when the discharge portion Tb2 by the second reverse rotating operation passes through the secondary transfer portion T2 (t6 to t7). Then, the voltage applied to the secondary transfer roller 9 is switched to the voltage of the positive polarity (which is the same polarity as the polarity during the second transfer), and the application of the voltage is continued until a time corresponding to one full circumference of the secondary transfer roller 9 has elapsed (t7 to t8). Thereafter, the recording material S reaches the secondary transfer portion T2 (t9), and the secondary transfer is carried out.

Thus, in this embodiment, in the image forming apparatus 100, in the case where the image bearing member 7 is the intermediary transfer member for conveying the toner image primary-transferred from another image bearing member 1 in order to secondary-transfer the toner image onto the recording material S as the toner image receiving member in the transfer portion T2 and where the transfer means includes the transfer roller 9 for forming the transfer portion T2 in contact with the image bearing member 7 and the controller 120 continuously executes the reverse and normal rotating sequence the plurality of times, when the portion on the image bearing member positioned in the contact portion Q after the reverse rotating operation and before the subsequent normal rotating operation is the discharge portion Tb, the controller 120 carries out control so that the position of the discharge portion Tb by at least the first reverse rotating operation with respect to the normal rotational direction of the image bearing member 7 becomes the position where the discharge portion Tb passes through the transfer portion T2 and can be moved from the transfer portion T2 by the present invention corresponding to one full circumference or more before the recording material S reaches the transfer portion T2 for the subsequent transfer, at the time of the end of the final normal rotating operation. In this embodiment, the controller 120 carries out control so that the positions of the discharge portions Tb by the plurality of reverse rotating operations including the first reverse rotating operation become the above-described positions. Incidentally, the above-described discharge portion Tb by at least the first reverse rotating operation may pass through the transfer portion T2 before the first recording material S in the job subsequently to the job in which the reverse and normal rotating sequence is continuously executed the plurality of times reaches the transfer portion T2. Further, the above-described discharge portion Tb by at least the first reverse rotating operation may pass through the transfer portion T2 before the rotation of the image bearing member 7 is stopped at the time of the end of the job in which the reverse and normal rotating sequence is executed the plurality of times. Further, the image forming apparatus 100 includes the power source 31 for forming the electric field in the transfer portion T2 under application of the voltage to the transfer means 9. Further, the controller 120 is capable of controlling the power source 31 so as to form the electric field in the same direction as the direction of the transfer electric field for the transfer and the electric field in the direction opposite to the direction of the transfer electric field, and can control the power source 31 so that the electric field in the direction opposite to the direction of the transfer electric field in the transfer portion T2 when the discharge portion Tb by at least the first reverse rotating operation passes through the transfer portion T2. Further, the controller 120 is capable of carrying out control so as to form the electric field in the direction opposite to the direction of the transfer electric field or to form the electric field in the direction opposite to the direction of the transfer electric field and the electric field in the same direction as the direction of the transfer electric field, in the transfer portion T2 after the discharge portion Tb by at least the first reverse rotating operation passes through the transfer portion T2.

As described above, according to this embodiment, not only an effect similar to the effect of the embodiment 1 can be obtained, but also it is possible to suppress the lateral stripe image and the toner contamination on the non-image surface of the recording material S in the subsequent job while minimizing the FCOT of the job subsequent to the job in which the reverse and normal rotation control is carried out.

Incidentally, in this embodiment, the position of the discharge portion Tb by the reverse and normal rotation control executed after the end of the post-rotation step of the job was described. However, also, in the case where the reverse and normal rotation control is executed in the sheet interval step as described in the embodiment 2, by a relationship with a timing when the recording material S reaches the secondary transfer portion T2 during image formation subsequent to the sheet interval step, the position of the discharge portion Tb at the time of the end of the reverse and normal rotation control is set similarly as described above, so that a similar effect can be obtained.

OTHER EMBODIMENTS

As described above, the present invention was described in accordance with the specific embodiments, but the present invention is not limited to the above-described embodiments.

In the above-described embodiments, the example in which the present invention is applied to the intermediary transfer member cleaning means was described, but is also applicable to the photosensitive member cleaning means, for example, so that it is possible to obtain an effect similar to those of the above-described embodiments.

Further, the image forming apparatus is not limited to the image forming apparatus of the tandem type, but may also be image forming apparatuses of other types. Further, the image forming apparatus is not limited to the image forming apparatus capable of forming the full-color image, but may also be an image forming apparatus capable of forming only a monochromatic (while/black or mono-color) image. Further, the image forming apparatus may also be image forming apparatuses for various uses, such as printers, various printing machines, copying machines, facsimile apparatuses, and multi-function machines.

According to the present invention, even in the case where the job in which the high-print ratio image is formed and the job in which the number of sheets subjected to the image formation, the pass-through toner deposited on the back surface of the cleaning blade is effectively removed, so that the generation of the lateral stripe image can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-030500 filed on Feb. 28, 2022, which is hereby incorporated by reference herein in its entirety.

What is claimed is:

1. An image forming apparatus comprising:

a rotatable image bearing member configured to bear a toner image on a surface thereof;

a transfer member configured to transfer the toner image from the image bearing member rotating in a normal rotational direction onto a toner image receiving member in a transfer portion;

a cleaning blade forming a contact portion in contact with the surface of the image bearing member and configured to remove toner from the surface of the image bearing member rotating in the normal rotational direction;

a driving portion capable of rotating the image bearing member in the normal rotational direction and a reverse rotational direction opposite to the normal rotational direction; and a controller capable of controlling the driving portion so as to perform a normal rotating operation which is a rotating operation of the image bearing member in the normal rotational direction and a reverse rotating operation of the image bearing member in the reverse rotational direction, wherein the controller is capable of executing an operation in a mode in which the following series of operations is performed when a job for transferring the toner image from the image bearing member onto the toner image receiving member is ended and in which rotation of the image bearing member is stopped after the series of operations is performed, wherein the series of operations is an operation in which an operation such that the normal rotating operation is performed after the reverse rotating operation is performed is executed a plurality of times, and includes a first reverse rotating operation which is the reverse rotating operation executed first in the reverse rotating operations executed in the series of operations, a first normal rotating operation which is the normal rotating operation executed subsequently to the first reverse rotating operation, a second reverse rotating operation executed finally in the reverse rotating operations of the series of operations, and a second normal rotating operation executed subsequently to the second reverse rotating operation, and wherein when a position of the image bearing member positioned in the contact portion at a time of an end of the first reverse rotating operation is a first position, the controller controls the driving portion so that the first position is not returned to the contact portion from an end of the first normal rotating operation to an end of the second normal rotating operation and so that a movement amount of the image bearing member in the second normal rotating operation is smaller than a movement amount of the image bearing member in the second reverse rotating operation.

2. An image forming apparatus according to claim 1, wherein the series of operations includes a third reverse rotating operation which is the reverse rotating operation executed subsequently to the first normal rotating operation and a third normal rotating operation which is the normal rotating operation executed subsequently to the third reverse rotating operation, and wherein when a position of the image bearing member positioned in the contact portion at a time of an end of the third reverse rotating operation is a second position, the controller controls the driving portion so that the second position is not returned to the contact portion until the second normal rotating operation ends after the position is moved by the third normal rotating operation.

3. An image forming apparatus according to claim 1, wherein of the series of operations, each of the reverse rotating operations executed after the first reverse rotating operation is smaller in movement amount after of the image bearing member than the normal rotating operation executed immediately before the reverse rotating operation.

4. An image forming apparatus according to claim 1, wherein the controller executes the operation in the mode in a case that a number of sheets outputted in the job is more than a predetermined number of sheets.

5. An image forming apparatus according to claim 4, wherein in a case that the number of sheets is not more than the predetermined number of sheets, at the time of the end of the job, the rotation of the image bearing member is stopped after the operation such that the normal rotating operation is performed after the reverse rotating operation is performed is executed once, and the controller controls the driving portion so that a movement amount of the image bearing member in the normal rotating operation is smaller than a movement amount of the image bearing member in the reverse rotating operation.

6. An image forming apparatus comprising:

a rotatable image bearing member configured to bear a toner image on a surface thereof;

a transfer member configured to transfer the toner image from the image bearing member rotating in a normal rotational direction onto a toner image receiving member in a transfer portion;

a cleaning blade forming a contact portion in contact with the surface of the image bearing member and configured to remove toner from the surface of the image bearing member rotating in the normal rotational direction;

a driving portion capable of rotating the image bearing member in the normal rotational direction and a reverse rotational direction opposite to the normal rotational direction; and a controller capable of controlling the driving portion so as to perform a normal rotating operation which is a rotating operation of the image bearing member in the normal rotational direction and a reverse rotating operation of the image bearing member in the reverse rotational direction, wherein the controller is capable of executing an operation in a mode in which the following series of operations is performed when a job for transferring the toner image from the image bearing member onto the toner image receiving member is ended and in which rotation of the image bearing member is stopped after the series of operations is performed, wherein the series of operations is an operation in which an operation such that the normal rotating operation is performed after the reverse rotating operation is performed is executed a plurality of times, and includes a first reverse rotating operation which is the reverse rotating operation executed first in the reverse rotating operations executed in the series of operations, a first normal rotating operation which is the normal rotating operation executed subsequently to the first reverse rotating operation, a second reverse rotating operation executed finally in the reverse rotating operations of the series of operations, and a second normal rotating operation executed subsequently to the second reverse rotating operation, and wherein when the controller controls the driving portion so that a first movement amount which is a sum of movement amounts of the image bearing member in the normal rotating operations executed after the first reverse rotating operation in the series of operations is larger than a second movement amount which is a sum of movement amounts of the image bearing member in the reverse rotating operations executed after the first reverse rotating operation and so that a movement amount of the image bearing member in the second normal rotating operation is smaller than a movement amount of the image bearing member in the second reverse rotating operation.

7. An image forming apparatus according to claim 6, wherein of the series of operations, each of the reverse rotating operations executed after the first reverse rotating operation is smaller in movement amount after of the image bearing member than the normal rotating operation executed immediately before the reverse rotating operation.

8. An image forming apparatus according to claim 6, wherein the controller executes the operation in the mode in a case that a number of sheets outputted in the job is more than a predetermined number of sheets.

9. An image forming apparatus according to claim 8, wherein in a case that the number of sheets is not more than the predetermined number of sheets, at the time of the end of the job, the rotation of the image bearing member is stopped after the operation such that the normal rotating operation is performed after the reverse rotating operation is performed is executed once, and the controller controls the driving portion so that a movement amount of the image bearing member in the normal rotating operation is smaller than a movement amount of the image bearing member in the reverse rotating operation.

* * * * *